(12) United States Patent
Tajima et al.

(10) Patent No.: US 8,315,161 B2
(45) Date of Patent: Nov. 20, 2012

(54) NETWORK DESIGN DEVICE AND NETWORK DESIGN METHOD

(75) Inventors: Kazuyuki Tajima, Kawasaki (JP); Toru Katagiri, Kawasaki (JP); Tomohiro Hashiguchi, Kawasaki (JP); Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 12/834,509

(22) Filed: Jul. 12, 2010

(65) Prior Publication Data

US 2011/0019554 A1 Jan. 27, 2011

(30) Foreign Application Priority Data

Jul. 24, 2009 (JP) ................................. 2009-173106

(51) Int. Cl.
*H04J 1/16* (2006.01)
*H04L 1/00* (2006.01)
*H04L 12/26* (2006.01)

(52) U.S. Cl. ........................................ 370/229; 370/238

(58) Field of Classification Search .......... 370/229–238; 709/220, 223; 398/173, 9
See application file for complete search history.

(56) References Cited

U.S. PATENT DOCUMENTS

| | | | | |
|---|---|---|---|---|
| 8,068,732 B2 * | 11/2011 | Hashiguchi et al. | ............ | 398/66 |
| 8,078,701 B2 * | 12/2011 | Hashiguchi et al. | .......... | 709/220 |
| 2006/0098987 A1 | 5/2006 | Hoshida | | |
| 2008/0144993 A1 | 6/2008 | Bottari et al. | | |
| 2009/0185805 A1 * | 7/2009 | Hashiguchi et al. | ............ | 398/58 |
| 2010/0061722 A1 * | 3/2010 | Hashiguchi et al. | ............ | 398/26 |

FOREIGN PATENT DOCUMENTS

| | | |
|---|---|---|
| JP | 2004-48477 A | 2/2004 |
| JP | 2006-135788 A | 5/2006 |
| JP | 2008-507223 A | 3/2008 |

* cited by examiner

*Primary Examiner* — Chuong T Ho
(74) *Attorney, Agent, or Firm* — Fujitsu Patent Center

(57) ABSTRACT

A network design device includes a bypass number setting unit setting the number of bypass node; a loss calculating unit calculating a reference loss; a graph generating unit generating a graph having a variation value obtained based on a difference between a transmission loss of a link coupling nodes to each other and the reference loss; a path detecting unit detecting a minimum-variation-path in which sum of each variation value from a start point to an end point of the graph is minimum; and a comparing unit comparing a calculation OSNR and a reference OSNR, the calculation OSNR being obtained by a calculation from a start point to an end point assuming that an optical amplifier is located on a node other than a bypass node on the minimum-variation-path, wherein the bypass number setting unit changes the number of bypass node based on a result of the comparing unit.

14 Claims, 27 Drawing Sheets

| SPAN | | TRANSMIS- |
|---|---|---|
| START NODE | END NODE | SION LOSS (dB) |
| n1 | n2 | 15 |
| n2 | n1 | 15 |
| n2 | n3 | 5 |
| n3 | n2 | 5 |
| n3 | n4 | 5 |
| n4 | n3 | 5 |
| n4 | n5 | 5 |
| n5 | n4 | 5 |
| n5 | n6 | 10 |
| n6 | n5 | 10 |
| n6 | n7 | 5 |
| n7 | n6 | 5 |
| n7 | n8 | 5 |
| n8 | n7 | 5 |
| n8 | n9 | 10 |
| n9 | n8 | 10 |

| SPAN | | TRANSMIS-SION LOSS (dB) |
|---|---|---|
| START NODE | END NODE | |
| n1 | n2 | 15 |
| n2 | n1 | 15 |
| n2 | n3 | 5 |
| n3 | n2 | 5 |
| n3 | n4 | 5 |
| n4 | n3 | 5 |
| n4 | n5 | 5 |
| n5 | n4 | 5 |
| n5 | n6 | 10 |
| n6 | n5 | 10 |
| n6 | n7 | 5 |
| n7 | n6 | 5 |
| n7 | n8 | 5 |
| n8 | n7 | 5 |
| n8 | n9 | 10 |
| n9 | n8 | 10 |

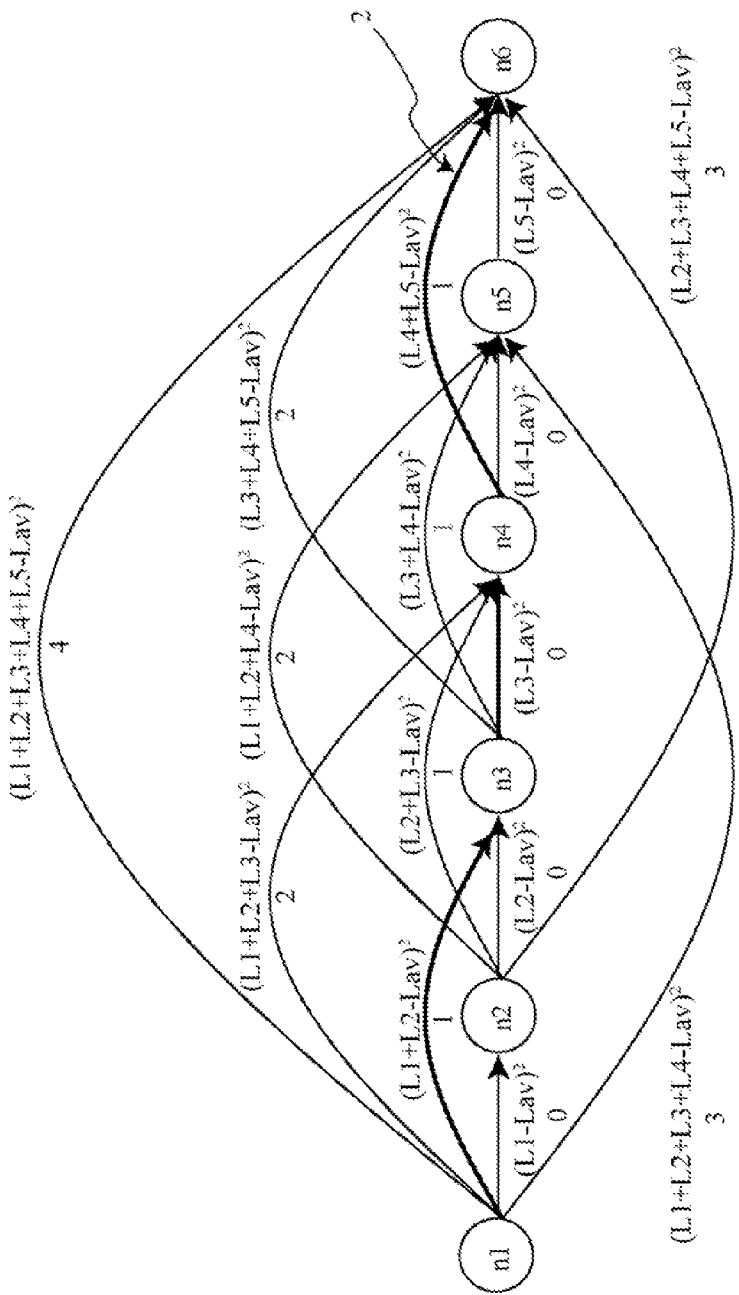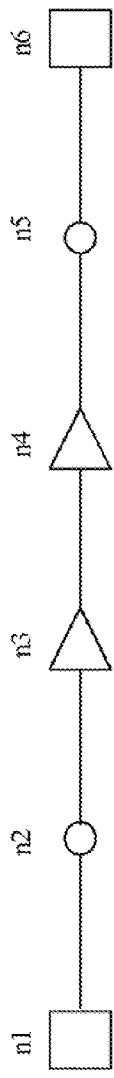
FIG. 10A
FIG. 10B

FIG. 26

| NODE | TYPE |
|---|---|
| n1 | |
| n2 | |
| n3 | HUB NODE |
| n4 | |
| n5 | |
| n6 | DESIGNATED BY USER |
| n7 | |
| n8 | |
| n9 | |
| n10 | HUB NODE |
| n11 | |
| n12 | |
| n13 | |
| n14 | | ately
NETWORK DESIGN DEVICE AND NETWORK DESIGN METHOD

CROSS-REFERENCE TO RELATED APPLICATION

This application is based upon and claims the benefit of priority of the prior Japanese Patent Application No. 2009-173106, filed on Jul. 24, 2009, the entire contents of which are incorporated herein by reference.

FIELD

A certain aspect of embodiments described herein relates to a network design device and a network design method.

BACKGROUND

A signal is transmitted over a long distance in the form of light without being converted into electrical signal in an optical network. A device amplifying the signal in the form of light is an optical amplifier. The transmission distance is increased, because the optical amplifier amplifies the power of the signal. On the other hand, a noise is generated at the optical amplifier. Heavy use of the optical amplifier may cause cost increase. It is therefore preferable that the number of optical amplifier is optimized. Design of optical amplifier location in network design is to determine where the optical amplifier is located in the network. Japanese Patent Application Publication Nos. 2008-507223, 2006-135788 and 2004-48477 disclose the design of optical amplifier location.

SUMMARY

According to an aspect of the present invention, there is provided a network design method executed in a computer including: setting the number of bypass node; calculating a reference loss based on the number of bypass node; generating a graph having a variation value obtained based on a difference between a transmission loss of a link coupling nodes to each other and the reference loss; detecting a minimum-variation-path in which sum of each variation value from a start point to an end point of the graph is minimum; comparing a calculation OSNR and a reference OSNR, the calculation OSNR being obtained by a calculation from a start point to an end point assuming that an optical amplifier is located on a node other than a bypass node on the minimum-variation-path; and changing the number of bypass node based on a result of the comparing of the calculation OSNR and the reference OSNR.

According to another aspect of the present invention, there is provided a network design device including: a bypass number setting unit setting the number of bypass node; a loss calculating unit calculating a reference loss based on the number of bypass node; a graph generating unit generating a graph having a variation value obtained based on a difference between a transmission loss of a link coupling nodes to each other and the reference loss; a path detecting unit detecting a minimum-variation-path in which sum of each variation value from a start point to an end point of the graph is minimum; and a comparing unit comparing a calculation OSNR and a reference OSNR, the calculation OSNR being obtained by a calculation from a start point to an end point assuming that an optical amplifier is located on a node other than a bypass node on the minimum-variation-path, wherein the bypass number setting unit changes the number of bypass node based on a result of the comparing unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10A illustrates a path example on the graph of FIG. 9;
FIG. 10B illustrates a location of an optical amplifier.

FIG. 26 illustrates an example of a result of searching of a hub node; and

DESCRIPTION OF EMBODIMENTS

Figures 1A, 1B:
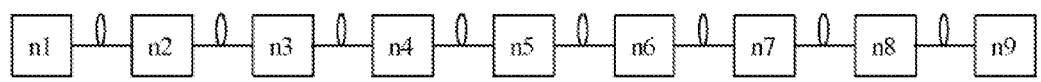
FIG. 1A illustrates an example of a network.
FIG. 1B illustrates an example of transmission loss of a span.

A description will be given of problem of the design of optical amplifier location. FIG. 1A illustrates an example of an optical network. In FIG. 1A, "n1" to "n9" correspond to a telephone office. A line between one node and another is referred to as a span. Each span is structured with a fiber and so on. The span may have a structure in which a plurality of fibers having different characteristics are coupled to each other.

FIG. 1B illustrates an example of transmission losses of each span. Normally, the transmission loss of a span is that of a fiber. However, if a loss of a coupler provided at an edge of an optical fiber is considered, the value of the transmission loss may include a coupler loss. The transmission loss of outward may be different from that of homeward with respect to the same span, because the span has an outward fiber and a homeward fiber separately.

Direction of the design of optical amplifier location includes a direction from the node n1 to the node n9 and a direction from the node n9 to the node n1. Here, a description is given of the direction of the node n1 to the node n9. The design of optical amplifier location is the same with respect to the reverse direction.

Figure 2:
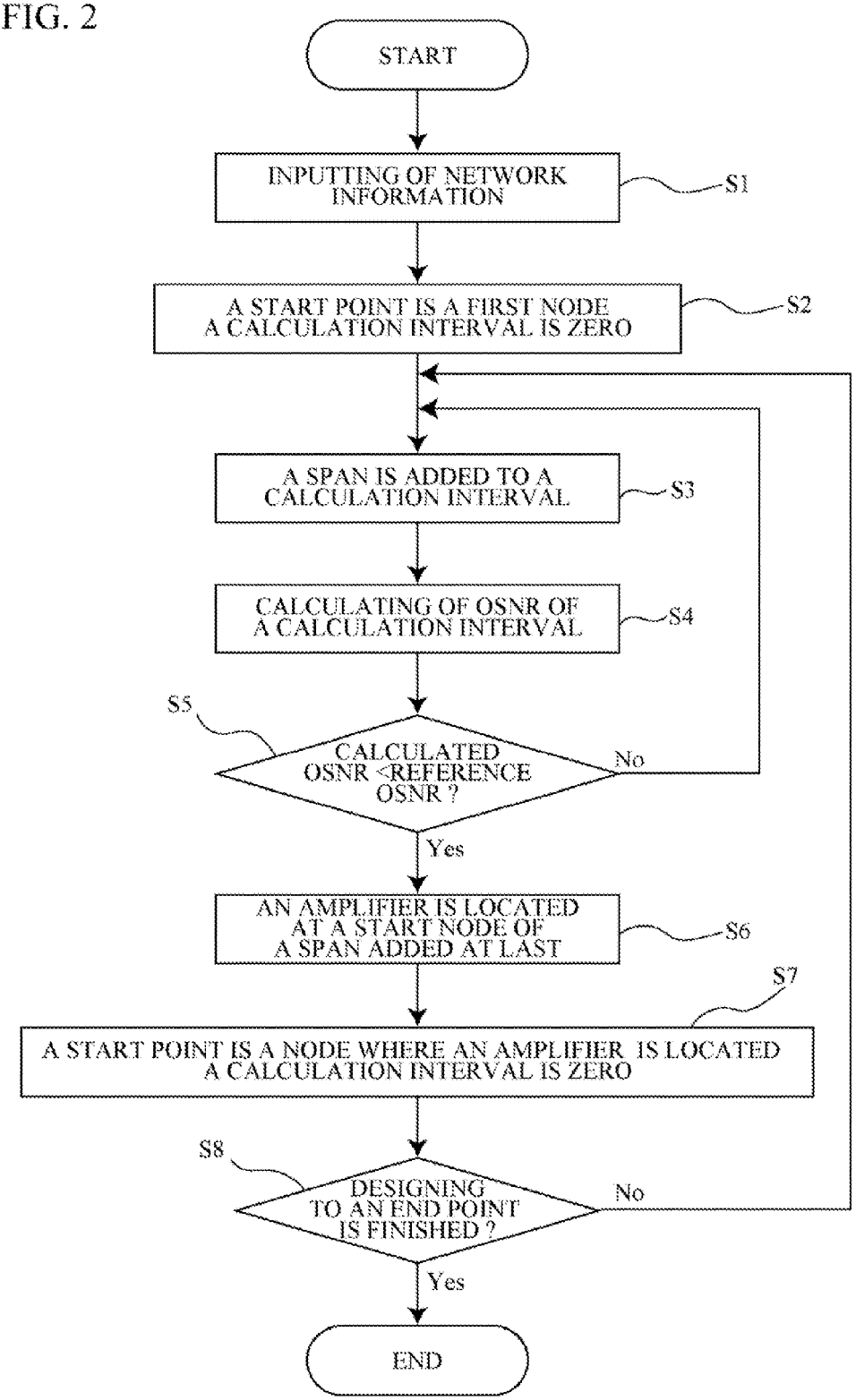
FIG. 2 illustrates a flowchart for design of optical amplifier location.

FIG. 2 illustrates a flowchart for the design of optical amplifier location. First, necessary network information like FIG. 1B is input (Step S1). Next, a start point is set to be a first node (the node n1), and the number of calculation interval is set to be zero (Step S2). Next, one span is added to the calculation interval from the start point (Step S3). For example, the span from the node n1 to the node n2 is added to the calculation interval.

Next, an OSNR (Optical Signal to Noise Ratio) of the calculation interval is calculated (Step S4). The OSNR is calculated, assuming that an optical amplifier is located on an end point of the span (the node n2). The OSNR is normally represented by "dB" indicating a ratio of signal/noise of light. The signal may be received properly when the ratio of signal/noise is large, because the signal is larger compared to the noise. The signal may not be transmitted when the OSNR is smaller than a given value, because the signal is not identified because of the noise.

If the calculation OSNR obtained by the calculation is larger than a reference OSNR, the transmission is determined to be possible (Step S5) and Step S3 is executed again. Next, a span from the node n2 to the node n3 is added to the calculation interval, because the span from the node n1 to the node n2 is previously added. Then, an OSNR from the node n1 to the node n3 is calculated. In this case, the OSNR is calculated, assuming that an optical amplifier is not located on the node n2 but located on the node n3. If the calculation OSNR obtained by the calculation is larger than the reference OSNR, a span from the node n3 to the node n4 is added to the calculation interval. An OSNR from the node n1 to the node n4 is calculated, assuming that an optical amplifier is not located on the node n2 and the node 3, but located on the node n4. If the calculation OSNR obtained by the calculation is larger than the reference OSNR, a span from the node n4 to the node n5 is added to the calculation interval and an OSNR from the node n1 to the node n5 is calculated.

If the calculation OSNR obtained by the calculation is smaller than the reference OSNR, the transmission is not possible even if an optical amplifier is located on the node n5. And so, it is determined that an optical amplifier should be located on a start point (the node n4) of the span added at last (step S6). The node n4 is set to be a start point, and the calculation interval is set to be zero (Step S7). And, Step S3 to Step S7 are executed again.

In concrete, a span from the node n4 to the node n5 is added to the calculation interval. An OSNR from the node n4 to the node n5 is calculated. If it is determined that the transmission is possible based on the calculation result, a span from the node n5 to the node n6 is added to the calculation interval, and an OSNR from the node n4 to the node n6 is calculated assuming that an optical amplifier is not located on the node n5 but located on the node n6. If it is determined that the transmission is possible based on the calculation result, a span from the node n6 to the node n7 is added to the calculation interval. If it is determined that the transmission is possible based on the calculation result, a span from the node n7 to the node n8 is added to the calculation interval.

If it is determined that the transmission is not possible when a span from the node n8 to the node n9 is added to the calculation interval and an OSNR from the node n4 to the node n9 is calculated, an optical amplifier is located on the node n8. The node n8 is set to be a start point, and the calculation interval is set to be zero. And, Step S3 to Step S7 are executed again. An optical amplifier is located on the node n9 and the design is finished, because the next node n9 is an end point of the network (Step S8).

Figure 3A:
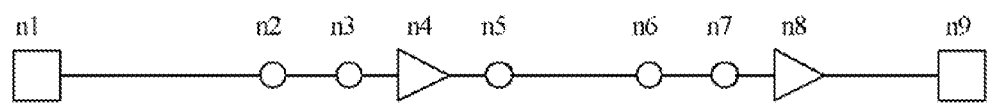
FIG. 3A illustrates a network where an optical amplifier is located in accordance with the flowchart of FIG. 2.

FIG. 3A illustrates a network example in which optical amplifiers are located in accordance with the flowchart of FIG. 2. In FIG. 3A, an optical amplifier is located on the node n4, the node n8 and the node n9. The node n2, the node n3, the node n5, the node n6, and the node n7 are bypassed. In FIG. 3A, the OSNR from the node n1 to the node n4 and from the node n4 to the node n8 is minimum OSNR allowing transmission. However, an interval from the node n8 to the node n9 is a fraction part in the above calculation. Therefore, an OSNR from the node n8 to the node n9 is larger than the OSNR from the node n1 to the node n4 and the OSNR from the node n4 to the node n8. With the flowchart of FIG. 2, only a fraction part has a large OSNR.

Figure 3B:
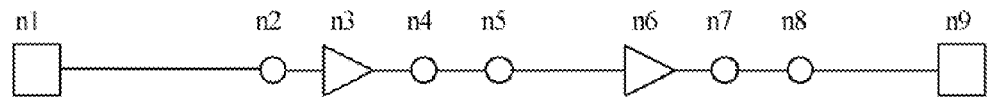
FIG. 3B illustrates a network in which optical amplifiers are located in a relatively even interval compared to the network of FIG. 3A.

FIG. 3B illustrates a network in which optical amplifiers are located in a relatively even interval compared to the network of FIG. 3A. A total OSNR of the network of FIG. 3B is larger than that of FIG. 3A.

A description will be given of this reason. A total OSNR of a network is represented as Expression (1). Japanese Patent Application publication No. 2006-135788 discloses Expression (1). In Expression (1), the OSNR is antilogarithm value. Expression (1) is represented by dB.

$$10 \log(OSNR) = 10 \log(P_{in}) - 10 \log(N_F) - 10 \log(hv \cdot B_{out}) = 10 \log(P_{out}) - \text{Loss} - 10 \log(N_F) - 10 \log(hv \cdot B_{out}) = -\text{Loss} + C1 \quad [\text{Expression (1)}]$$

The first term, the third term, and the fourth term of the second expression of Expression (1) may be treated as a constant value. Therefore, the sum of the three terms is replaced by "C1" in the third expression. "Loss" of Expression (1) indicates a loss of a transmission path. The loss of transmission path is normally represented by dB and is described not in the form of logarithm.

Figure 3C:
FIG. 3C illustrates a network having three nodes.

Here, a network having three nodes like FIG. 3C is considered. In FIG. 3C, a transmission loss of a span from the node n1 to the node n2 is represented as "L1". A transmission loss of a span from the node n2 to the node n3 is represented as "L2". And, it is assumed that L1+L2=L. That is, L2=L−L1. An OSNR from the node n1 to the node n3 is calculated assuming that an optical amplifier is located on the node n2 and the node n3 in the network. The calculation OSNR is represented as Expression (2).

$$OSNR = \{\Sigma OSNR_i^{-1}\}^{-1} =$$
$$(10^{\frac{L1-C1}{10}} + 10^{\frac{L-L1-C1}{10}})^{-1} =$$
$$10^{10C1}(10^{10L1} + 10^{10L-L1})^{-1}$$

"L1" allowing the maximum OSNR is calculated in a condition that "L" is fixed and the value of "L1" is changed arbitrarily. This results in that L1=L2=L/2. That is, Expression (2) indicates that the OSNR is the largest when the transmission loss is even. In this case, the OSNR from the node n1 to the node n2 is equal to the OSNR from the node n2 to the node n3. The OSNR from the node n1 to the node n9 of the network of FIG. 3B is larger than that of the network of FIG. 3A, because the OSNR is the largest when each OSNR between optical amplifiers is even. However, optical amplifiers are located unevenly with the method of FIG. 2.

Japanese Patent Application Publication No. 2004-48477 discloses a method of calculating standardized noise from an optical amplifier location like FIG. 3A and relocating the optical amplifier so that the standardized noise gets even. The standardized noise is a reciprocal of the OSNR in a case where a signal is standardized as "1". However, the total OSNR from one edge to the other edge in a case where each OSNR is even is different from that in a case where each OSNR is not even. Therefore, the location of FIG. 3B cannot be calculated from the standardized noise obtained from the optical amplifier location of FIG. 3A.

As mentioned above, the OSNR changes according to the optical amplifier location. Therefore, the optical amplifier location in which each OSNR is even cannot be calculated with the method of calculating the OSNR directly.

The following is a description of embodiments of the present invention, with reference to the accompanying drawings.

First Embodiment

Figure 4A:
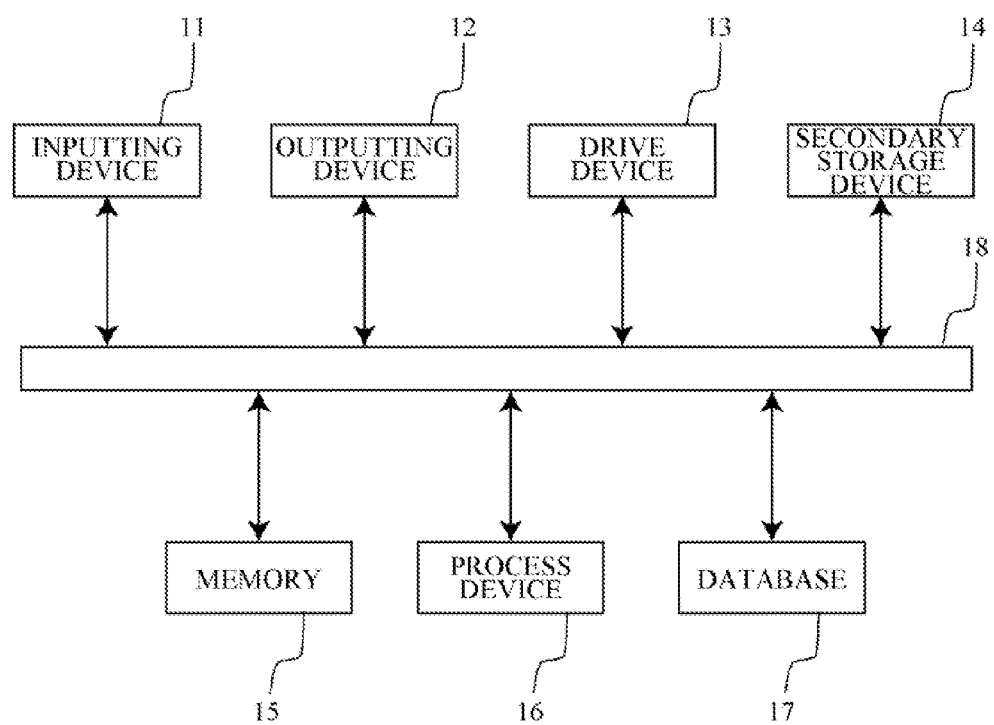
FIG. 4A illustrates a hardware structure of a network design device in accordance with a first embodiment.

FIG. 4A illustrates a hardware structure of a network design device 100 in accordance with a first embodiment. As illustrated in FIG. 4A, the network design device 100 includes an inputting device 11, an outputting device 12, a drive device 13, a secondary storage device 14, a memory 15, a process device 16 and a database 17. These components are coupled with each other through a system bus 18. The network design device 100 may be a dedicated device. The network design device 100 may be a general-purpose personal computer, a workstation or the like.

The inputting device 11 is a keyboard, a mouse or the like used by a user. The user can input data with the inputting device 11. The outputting device 12 is a display or the like displaying design result of the network design device 100. The outputting device 12 operates according to execution of a program. The program may be installed on the secondary storage device 14 through the drive device 13 and so on.

The process device 16 controls the network design device 100 according to the program read and stored by the memory 15. Information for executing the program can be read from the database 17.

Figure 4B:
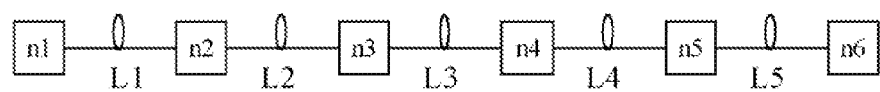
FIG. 4B illustrates a structure example of an optical network that is designed with use of the network design device.

FIG. 4B illustrates a structure example of an optical network that is designed with use of the network design device 100. In FIG. 4B, a value under each span indicates transmission loss of each span.

Figure 5:
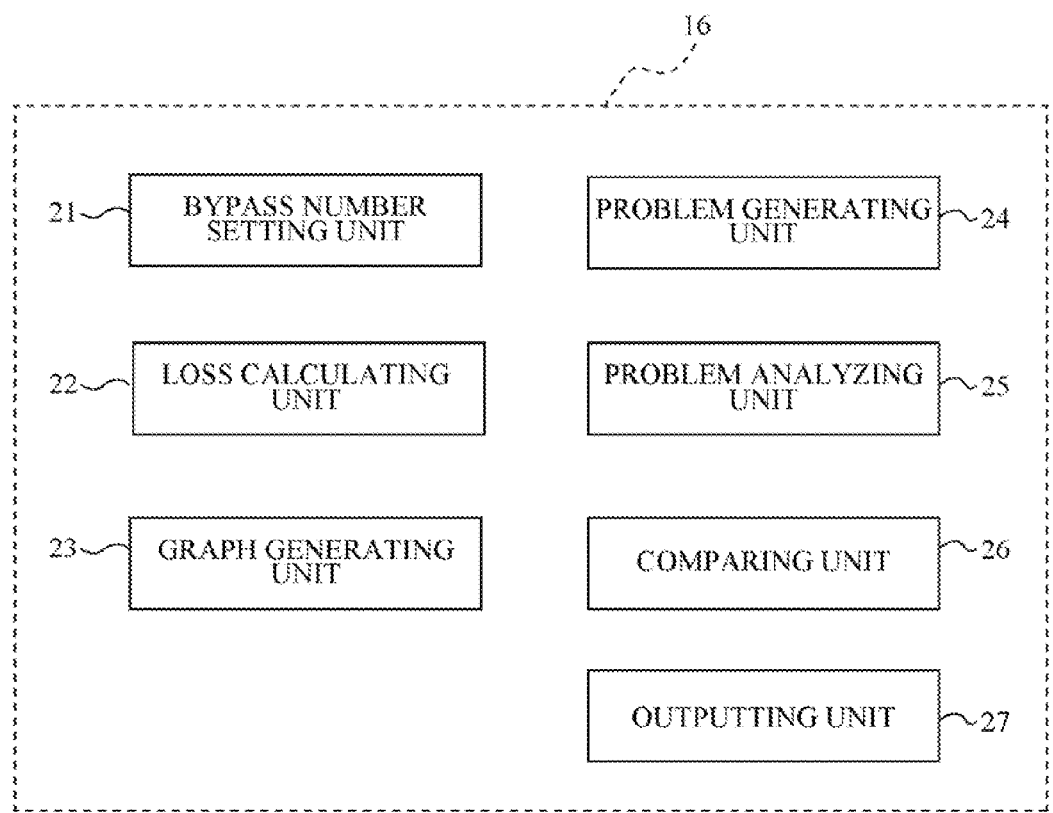
FIG. 5 illustrates a block diagram of a function that is generated when a process device executes a program.

FIG. 5 illustrates a block diagram of a function that is generated when the process device 16 executes the program. With reference to FIG. 5, the program generates a bypass number setting unit 21, a loss calculating unit 22, a graph generating unit 23, a problem generating unit 24, a problem analyzing unit 25, a comparing unit 26, and an outputting unit 27, in the network design device 100. A description will be given of an operation of the above components.

Figure 6:
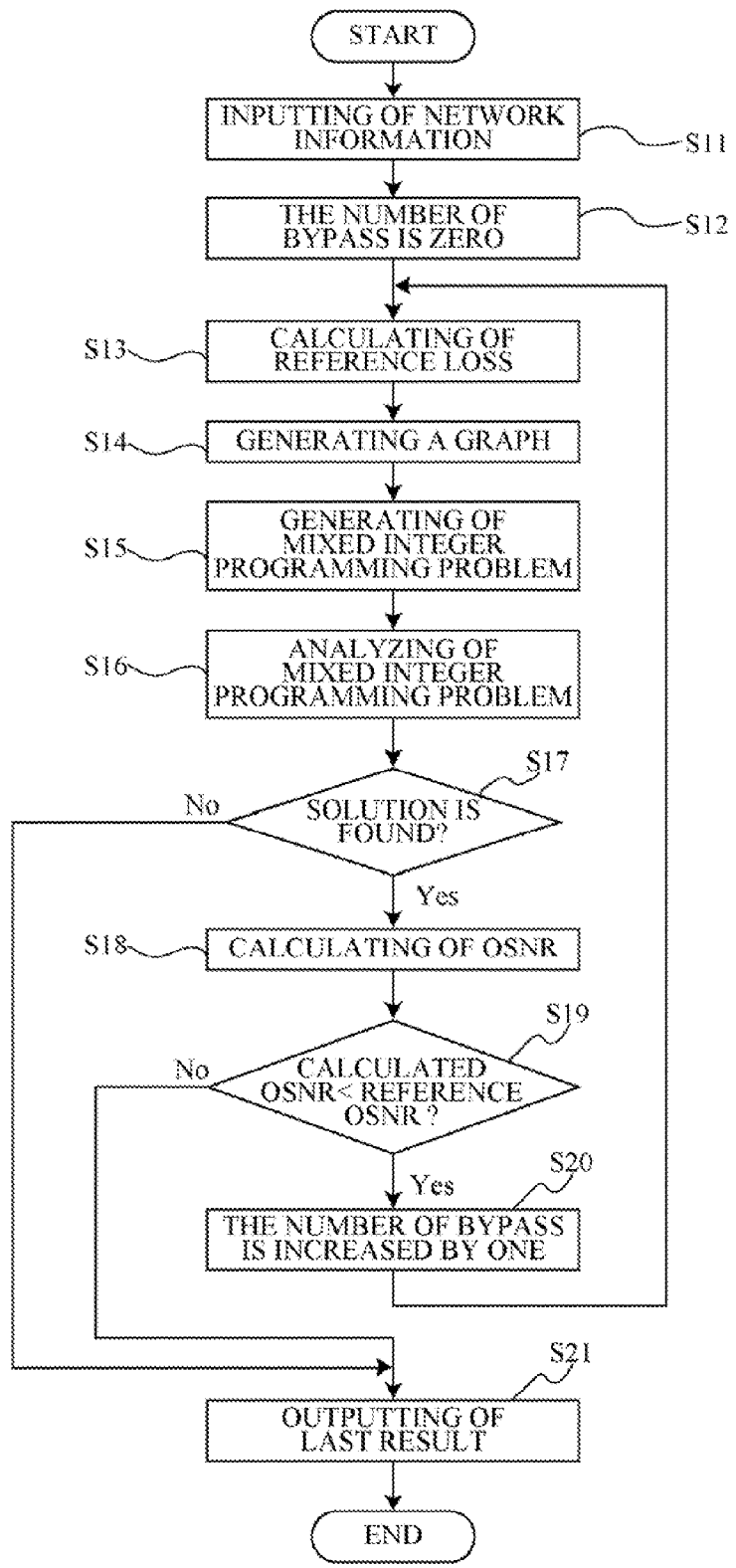
FIG. 6 illustrates a flowchart example executed in the network design device.

FIG. 6 illustrates a flowchart example executed in the network design device 100. First, the network design device 100 stores network information input by a user (Step S11). The network information may be transmission loss information of each span illustrated in FIG. 1B, an OSNR reference value for determining transmission availability, and so on. Topology information indicating coupling relationship between one node and another may be required. However, the table illustrated in FIG. 1B may be used as a substitute for the topology information, because FIG. 1B teaches a coupling between one node and another of each span. The inputting device 11 inputs the network information. After that, the network information is stored in the database 17.

Next, the bypass number setting unit 21 initially sets the number of bypass node to be zero (Step S12). The bypass node is a node to be bypassed and is a node other than a start point and an end point. There is no optical amplifier at the bypass node. The number of nodes where an optical amplifier is located is obtained when the number of bypass node is subtracted from the total number of node except for the start point and the end point. An optical amplifier for receiving is located on a node at the end point. There is no case where an optical amplifier is not located on the node at the end point. And so, it is assumed that an optical amplifier is always located on the end node. In the following description, the end node is not included in the number of nodes where an amplifier is located.

Next, the loss calculating unit 22 calculates a reference loss Lav (Step S13). The reference loss Lav is obtained when total transmission loss from the start point to the end point is divided by the number of node where an optical amplifier is located plus one. "the number of node where an optical amplifier is located plus one" is the number of interval between the start point and a node where an optical amplifier is located, between nodes where an optical amplifier is located, and between a node where an optical amplifier is located and the end point.

Figure 7A:
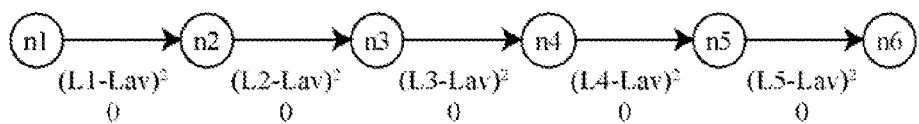
FIG. 7A illustrates a graph according to the network of FIG. 4B.

Next, the graph generating unit 23 generates a graph (Step S14). FIG. 7A illustrates a graph according to the network of FIG. 4B. In FIG. 7A, each node is coupled through a link. Here, the link is a directed edge with direction of amplifier location design, when each node is vertex. Two values are added to each link in FIG. 7A. The two values are two types of weights given to a link. Upper side value is a variation value. Lower side value is the number of bypass node.

The variation value is a square of subtraction between transmission loss of spans included in a link and the reference loss Lav. For example, the variation value is a square of "L1−Lav", because the transmission loss of the span is L1 with respect to the link of FIG. 7A according to a span between the node n1 and the node n2 of FIG. 4A. The variation value may also be an absolute of "L1−Lav", or a plus square root of a square of "L1−Lav". The number of bypass node indicates the number of node where a link bypasses. In FIG. 7A, each of the number of bypass node is zero.

Figure 7B:
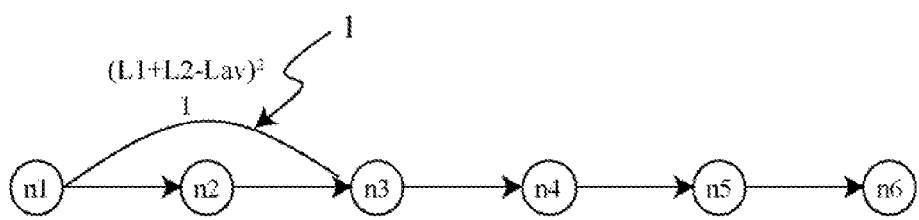
FIG. 7B illustrates a case where a bypass link bypassing a node n2 is added.

The graph generating unit 23 adds a bypass link bypassing at least one node to the graph of FIG. 7A. FIG. 7B illustrates a case where a bypass link bypassing the node n2 is added. A first bypass link of FIG. 7B is coupled directly to the node 3 from the node n1 without passing the node n2. The first bypass link indicates a case where an optical amplifier is not located on the node n2. Therefore, transmission loss of the first bypass link is total transmission loss between a span from the node n1 to the node n2 and a span between the node n2 and the node n3. The number of bypass node of the first bypass link is "1", because the node n2 is bypassed. The graph generating unit 23 adds all links to the graph.

Figure 8:
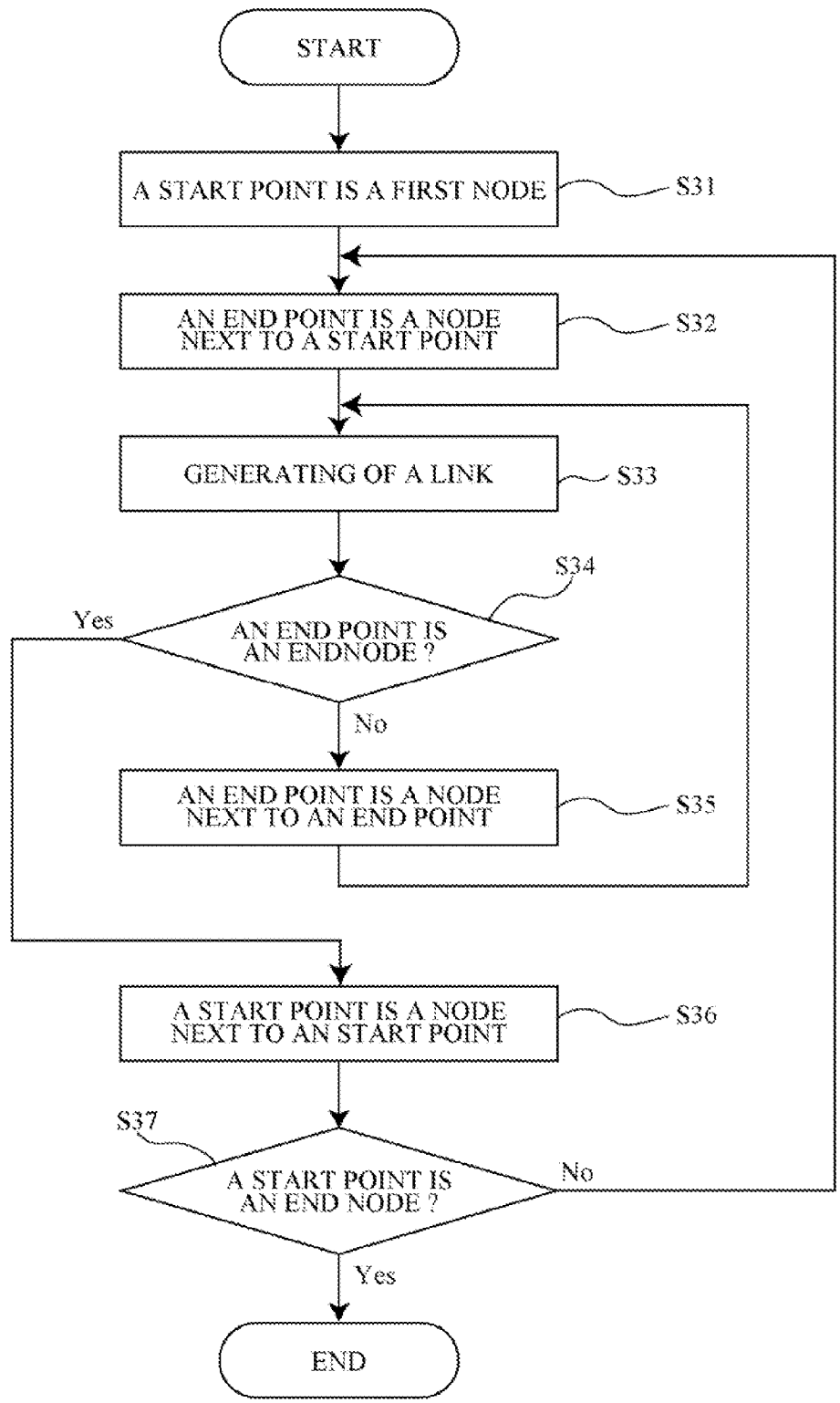
FIG. 8 illustrates a flowchart example for adding link to a graph.

FIG. 8 illustrates a flowchart example for adding link to a graph. The graph generating unit 23 sets a first node of a network for design to be a start point (Step S31). Next, the graph generating unit 23 sets a node next to the start point to be an end point (Step S32). Then, the graph generating unit 23 generates a link from the start point to the end point with a method explained in FIG. 7B (Step S33).

Next, the graph generating unit 23 determines whether the end point set in Step S32 is an end node of the network (Step S34). If it is not determined that the end point is the end node in Step S34, the graph generating unit 23 sets the end point to be a node next to the present end point (Step S35). After that, the graph generating unit 23 executes Step S33 again.

Figure 9:
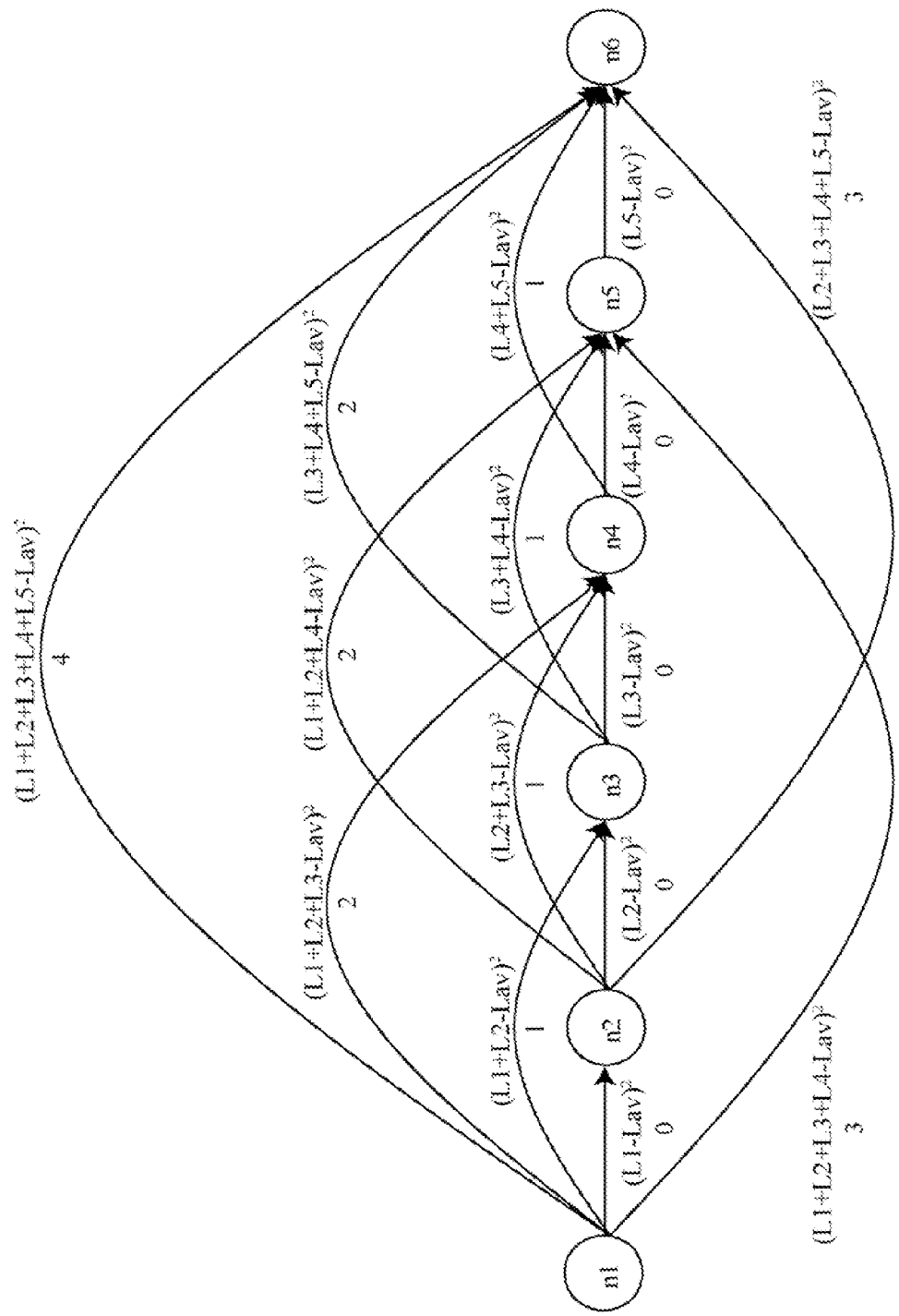
FIG. 9 illustrates a graph example to which all links are added.

If it is determined that the end point is the end node in Step S34, the graph generating unit 23 sets the start point to be a node next to the present start point (Step S36). Next, the graph generating unit 23 determines whether the start point set in Step S36 is an end node of the network (Step S37). If it is not determined that the start point is the end node, the graph generating unit 23 executes Step S32 again. If it is determined that the start point is the end node in Step S37, the graph generating unit 23 terminates the flowchart. FIG. 9 illustrates a graph example to which all links are added.

Next, a description will be given of a path from a start point to an end point of a generated graph. FIG. 10A illustrates a path example on the graph of FIG. 9. In FIG. 10A, a heavy line is a path 2 on the graph. The path 2 on the graph passes through a link from the node n1 to the node n3, a link from the node n3 to the node n4, and a link from the node n4 to the node n6. Nodes on the graph where the path 2 bypasses are bypass nodes. In FIG. 10A, the node n2 and the node n5 are the bypass nodes.

On the other hand, the node n3 and the node n4 are nodes where an optical amplifier is located. Therefore, the location of the optical amplifier is illustrated as FIG. 10B, if the path 2 is obtained as a solution. As illustrated, a path on the graph corresponds to the optical amplifier location one to one. The number of bypass node of the optical amplifier location is sum of the number of bypass node given to a link where the path 2 passes.

The number of bypass node of the link from the node n1 to the node n3 is "1". The number of total bypass node of the link from the node n3 to the node n4 is "0". The number of bypass node of the link from the node n4 to the node n6 is "1". Therefore, the sum of the number of bypass node is "2".

Similarly, sum of variation values of transmission loss between located optical amplifiers is sum of variation values given to links where the path 2 passes. Therefore, an optical amplifier location having the smallest variation value of transmission loss between optical amplifiers is obtained when a path having the smallest sum of the variation values.

With reference to FIG. 6 again, the problem generating unit 24 generates a mixed integer programming problem for searching a path from a start node to an end node on the generated graph (Step S15). In the embodiment, it is a constraint condition that the number of bypass node of a path is equal to the number of bypass node set by the bypass number setting unit 21. And, a path having the smallest sum of variation values is a solution of the mixed integer programming problem.

In the embodiment, the mixed integer programming problem is formulated as follows.

(Note)

$x[i, j]$ is "1" in a case where a link from a node "i" to a node "j" on a graph is passed, and is "0" in the other cases.

$a[i, j]$ is the number of bypass node given to the link from the node "i" to the node "j" on the graph.

$b[i, j]$ is variation value given to the link from the node "i" to the node "j".

(Objective Function)

minimize: Expression (3)

$$\sum_{(i,j) \in E} b[i, j] x[i, j] \qquad \text{[Expression (3)]}$$

[i, j] indicates the link from the node "i" to the node "j" on the graph.

"E" indicates a set of all of links on the graph.

(Constraint Condition)

$$\sum_{(i,j) \in E} a[i, j] x[i, j] = N \qquad \text{[Expression (4)]}$$

"N" indicates the number of bypass node.

With respect to a halfway node i, $$\sum_j x[i, j] \leq 1 \qquad \text{[Expression (5)]}$$

$$\sum_j x[i, j] - \sum_j x[j, i] = 0 \qquad \text{[Expression (6)]}$$

With respect to a start node, $$\sum_j x[i, j] = 1 \qquad \text{[Expression (7)]}$$

$$\sum_j x[i, j] = 0 \qquad \text{[Expression (8)]}$$

With respect to an end node, $$\sum_j x[j, i] = 1 \qquad \text{[Expression (9)]}$$

$$\sum_j x[j, i] = 0 \qquad \text{[Expression (10)]}$$

The first constraint condition (Expression (4)) is that sum of the number of bypass node of each path is equal to the number of bypass node set by the bypass number setting unit 21. The constraint condition with respect to a halfway node (Expression (5) and Expression (6)) is that the halfway node is passed at most once and the number of link entering the halfway node is equal to the number of link getting out of the halfway node. The constraint condition with respect to the start node (Expression (7) and Expression (8)) is that the number of link getting out of the start node is always one and the number of link entering the start node is always zero. The constraint condition with respect to the end node (Expression (9) and Expression (10)) is that the number of link getting out of the end node is always zero and the number of link entering the end node is always one.

Next, the problem analyzing unit 25 analyzes the mixed integer programming problem having the above-mentioned constraint conditions and an objective function (Step S16). A solving method of the mixed integer programming problem is generally well known. For example, the method is disclosed in Masatoshi Sakawa: Optimization of Discrete System, Morikita Publishing Co., Ltd, May, 2000.

The solution of the mixed integer programming problem is obtained as x[i, j]. The path having the smallest variation value is a path in which links having the x[i, j]=1 are coupled. An optical amplifier location is made from the path having the smallest variation value. Next, the problem analyzing unit 25 determines whether a solution of the above-mentioned mixed integer programming problem (Step S17) is found. If it is determined that a solution of mixed integer programming problem in Step 17 is found, the comparing unit 26 calculates an OSNR from the start point to the end point with respect to the optical amplifier location, and calculates an calculation OSNR (Step S18).

Next, the comparing unit 26 determines whether the calculation OSNR obtained in Step S18 is larger than the reference OSNR (Step S19). If it is determined that the calculation OSNR is larger than the reference OSNR, the bypass number setting unit 21 increases the number of bypass node by one (Step S20). After that, the loss calculating unit 22 executes Step S13 again.

If it is not determined that a solution is found in Step S17, or if it is not determined that the calculation OSNR is larger than the reference OSNR, the outputting unit 27 outputs the last result (Step S21). In this case, the outputting unit 27 outputs a result through the outputting device 12. The outputting unit 27 outputs "no solution is found" through the outputting device 12, because no solution to be output is found when the flowchart is executed at first time. After that, the network design device 100 terminates the flowchart.

In the embodiment, the number of optical amplifier may be reduced in a range where transmission loss at each link is less than the reference loss. And, the optical amplifier may be located so that the OSNR of each link gets even. It is therefore possible to reduce the number of optical amplifier and to enlarge the total OSNR of the network.

In the embodiment, the problem generating unit 24 and the problem analyzing unit 25 act as a path detecting unit for searching a path having the smallest variation (minimum-variation-path). In the embodiment, the mixed integer programming problem is analyzed for detecting the path having the smallest variation (minimum-variation-path). However, the method is not limited.

First Modified Embodiment

The time for obtaining a solution of a mixed integer programming problem may get longer when an initial value of the number of bypass node is greatly different from an optimal value of the number of bypass node. And so, the initial value of the number of bypass node may be set to be a value closer to the optimal value. For example, the initial value of the number of bypass node may be a value obtained by rounding the sum of transmission loss from a start point to an end point divided by a given value down to an integer. A description will be given of a concrete example.

In a case of a WDM device for long distance, an optical output of an optical transmitter is very strong. Therefore, there is a case where a variable attenuator (ATT) is provided between the optical transmitter and a fiber or between the fiber and an optical receiver, if transmission loss is small because the distance is short. Here, the output of the optical transmitter is represented as "Pout". Loss of the fiber is represented as "Lf". Attenuation amount of the optical attenuator is represented as "La". The maximum input of the optical receiver is represented as "Pinmax". The attenuator adjusts the attenuation amount La so that Expression (12) is satisfied, when Expression (11) is satisfied.

$$Pout-Lf>Pin\max \quad (11)$$

$$Pout-(Lf+La)=Pin\max \quad (12)$$

If Expression (11) is satisfied, the input of the optical receiver is always Pinmax. Therefore, an OSNR is constant, regardless of the loss of the fiber. This means that the OSNR is constant even if a node is bypassed, if the sum of the transmission loss is equal to or less than (Pout−Pinmax). Therefore, the optimal solution is not found if the reference loss is equal to or less than (Pout−Pinmax).

Figure 11:
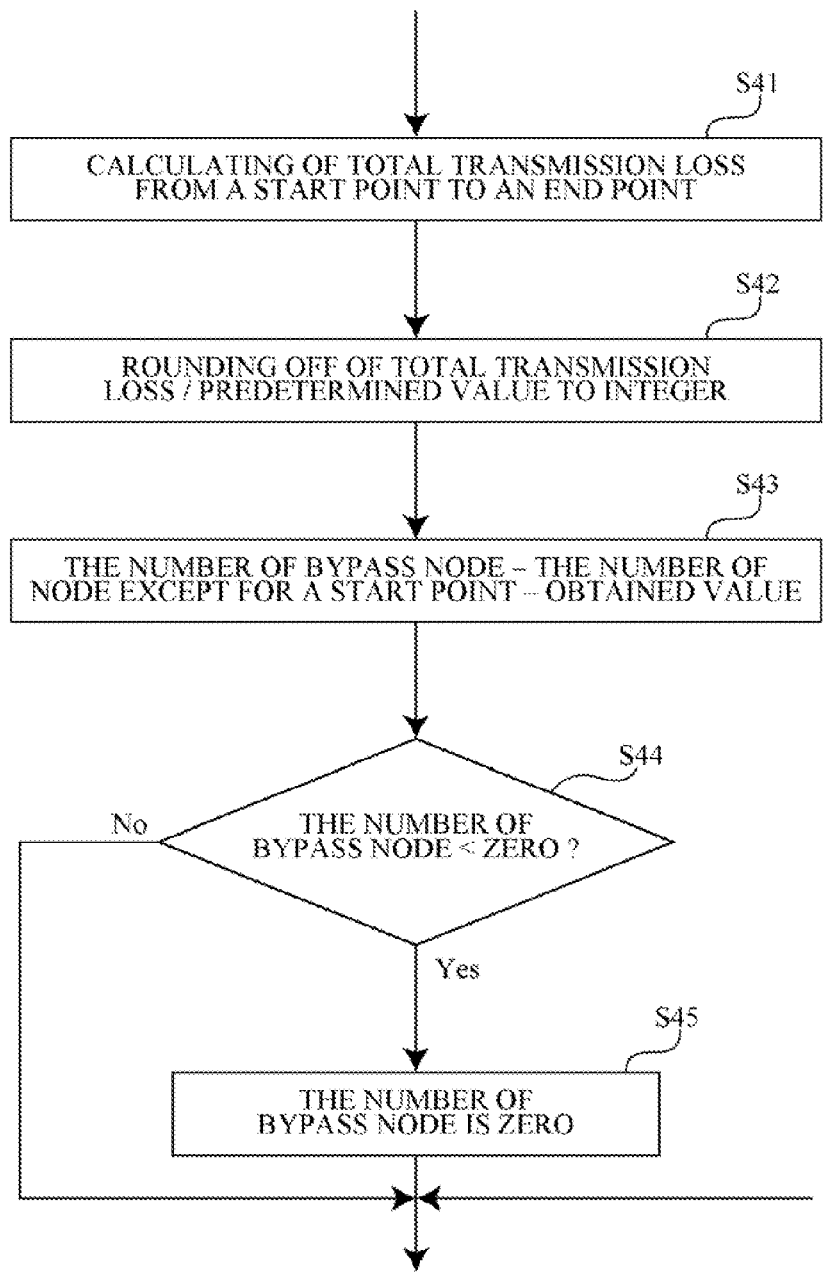
FIG. 11 illustrates Step S41 to Step S45.

And so, the network design device 100 may execute the following Step S41 to Step S45 instead of Step S12 in FIG. 6. FIG. 11 illustrates Step S41 to Step S45. First, the loss calculating unit 22 calculates sum of transmission loss from a start point to an end point after executing Step S11 of FIG. 6 (Step S41).

Next, the loss calculating unit 22 rounds a value obtained by dividing the sum of the transmission loss by a given value down to an integer (Step S42). (Pout−Pinmax) is used as the given value. It is possible to obtain the number of optical amplifier in a case where the optical amplifier is located with transmission loss of (Pout−Pinmax), when Step S42 is executed.

Next, the bypass number setting unit 21 sets the initial value of the number of bypass node number to be a value obtained by subtracting the value obtained in Step S42 from the number of node except for the start point (Step S43). However, there is a case where the number of bypass node is minus when the number of node of the base network is small. And so, the bypass number setting unit 21 determines whether the number of bypass node is minus (Step S44).

If it is not determined that the number of bypass node is minus in Step S44, the loss calculating unit 22 executes Step S13 of FIG. 6. If it is determined that the number of bypass node is minus, the bypass number setting unit 21 sets the initial value of the number of bypass node to be zero (Step S45). After that, the loss calculating unit 22 executes Step S13 of FIG. 6.

In the modified embodiment, the initial value of the number of bypass node may be set to be a value closer to an optimized solution. Therefore, the number of loop count for obtaining the solution of the mixed integer programming problem may be reduced. This allows reduction of time for obtaining the solution.

Second Modified Embodiment

There is a case where it is not possible to bypass nodes before and after a fiber having large transmission loss. Therefore, an optical amplifier is located on the nodes before and after the fiber having large transmission loss. However, when this is not considered, the time for obtaining the solution of the mixed integer programming problem may be enlarged because the number of bypass node is estimated to be lower. And so, the initial value of the number of bypass node may be set to be a value closer to the optimized value, when there is a fiber having large transmission loss.

For example, the network may be divided at a node having total transmission loss of spans before and after thereof larger than an allowable loss range of an optical amplifier. The initial value of the number of bypass node may be a value that is obtained by rounding the total transmission loss from a start point to an end point of the divided part divided by a given value down to an integer. A description will be given of a concrete example.

For example, the allowable value may be determined as an upper limit of transmission loss determined by a gain of an optical amplifier. Next, transmission losses of spans before and after each node except for the start point and the end point of the network are totalized. It is not possible to bypass a node having the obtained total value larger than the allowable loss range. The network is temporally divided at the node.

Figure 12:
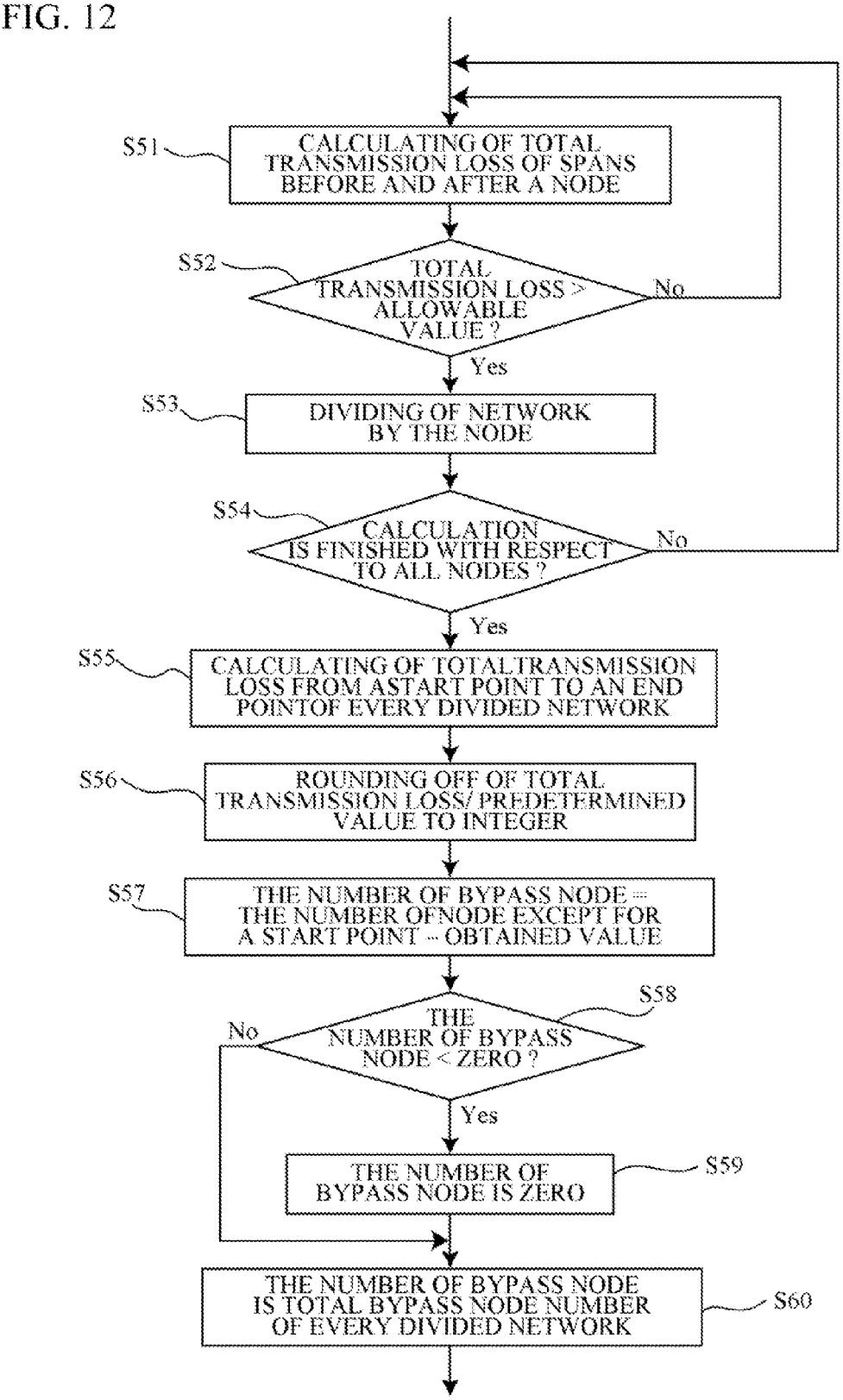
FIG. 12 illustrates Step S51 to Step S60.

The network design device 100 may also execute the following Step S51 to S60 in stead of Step S12 of FIG. 6. FIG. 12 illustrates Step S51 to Step S60. The loss calculating unit 22 calculates sum of transmission loss of spans before and after a node after executing Step S11 of FIG. 6 (Step S51).

Next, the loss calculating unit 22 determines whether the sum of the transmission loss obtained in Step S51 is larger than the allowable value (Step S52). If it is not determined that the sum is larger than the allowable value in Step S52, the loss calculating unit 22 returns to Step S51 and calculates sum of transmission loss of spans before and after a next node. If it is determined that the sum is larger than the allowable value in Step S52, the loss calculating unit 22 divides the network at the node in Step S51 (Step S53).

Next, the loss calculating unit 22 determines whether calculation of total transmission loss with respect to all nodes are finished (Step S54). If it is not determined that the calculation is finished in Step S54, the loss calculating unit 22 returns to Step S51 and calculates sum of transmission loss of spans before and after a next node.

If it is determined that the calculation is finished in Step S54, the loss calculating unit 22 calculates sum of transmission loss from a start point to an end point of each divided network (Step S55). Next, the loss calculating unit 22 rounds a value obtained by dividing the sum of the transmission loss by a given value down to an integer value (Step S56). (Pout−Pinmax) may be used as the given value.

Next, the bypass number setting unit 21 sets a value obtained by subtracting the value obtained in Step S56 from the number of node except for the start point to be the initial value of the number of bypass node number (Step S57). Next, the bypass number setting unit 21 determines whether the number of bypass node is minus (Step S58). If it is not determined that the number of bypass node is minus in Step S58, the bypass number setting unit 21 sets the number of bypass node to be the sum of the number of bypass node of each divided network (Step S60). After that, the loss calculating unit 22 executes Step S13 of FIG. 6. If it is determined that the number of bypass node is minus in Step S58, the bypass number setting unit 21 sets the number of bypass node to be zero (Step S59). After that, the bypass number setting unit 21 executes Step S60.

Figure 13:
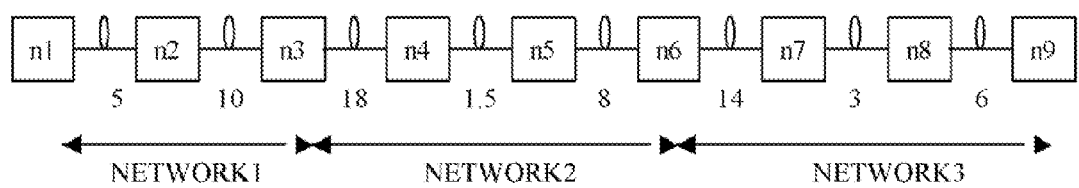
FIG. 13 illustrates an example of divided networks when an allowable value is 20 dB.

FIG. 13 illustrates an example of divided networks when the allowable value is 20 dB. A value under each span indicates transmission loss. For example, a sum of transmission losses of spans before and after the node n2 is 15 dB and is lower than the allowable value. A sum of transmission losses of spans before and after the node n3 is 28 dB and is larger than the allowable value. The loss calculating unit 22 divides the network into a network from the node n1 to the node n3 and a network from the node n3 to the node n9.

A sum of transmission loss of spans before and after the node n4, the node n5, the node n7 and node n8 is lower than the allowable value. However, a sum of transmission loss of spans before and after the node n6 is 22 dB, and is larger than the allowable value. The loss calculating unit 22 divides the network into a network from the node n3 to the node n6 and a network from the node n6 to the node n9. Thus, the network of FIG. 12 is divided into three parts.

In the modified embodiment, the initial value of the number of bypass node may be set to be a value closer to the optimized value even if the network includes a fiber having large transmission loss. Therefore, the loop count for obtaining the solution of the mixed integer programming problem may be reduced. This allows reduction of time for obtaining the solution.

Third Modified Embodiment

When the number of bypass node finally obtained is large, the time for obtaining the solution of the mixed integer programming problem gets longer if the number of bypass node is increased from lower value during the analyzing. And so, the initial value of the number of bypass node may be set to be a value closer to the optimized value.

For example, the initial value of the number of bypass node may be a value that is obtained by dividing a sum of transmission loss from a start point to an end point of a network by an upper limit value of the transmission loss and rounding the obtained value down to an integer. A description will be given of a concrete example.

As mentioned above, an optical amplifier has an allowable upper limit value with respect to transmission loss. It is therefore not possible to locate an optical amplifier at an interval that allows the transmission loss more than the upper limit value. Therefore, a minimum value of the number of located optical amplifier is a value obtained by dividing the transmission loss from the start point to the end point by the upper limit of the transmission loss. The solution of the mixed integer programming problem may be obtained by decreasing the number of bypass node, after the minimum value of the number of located optical amplifier is obtained.

Figure 14:
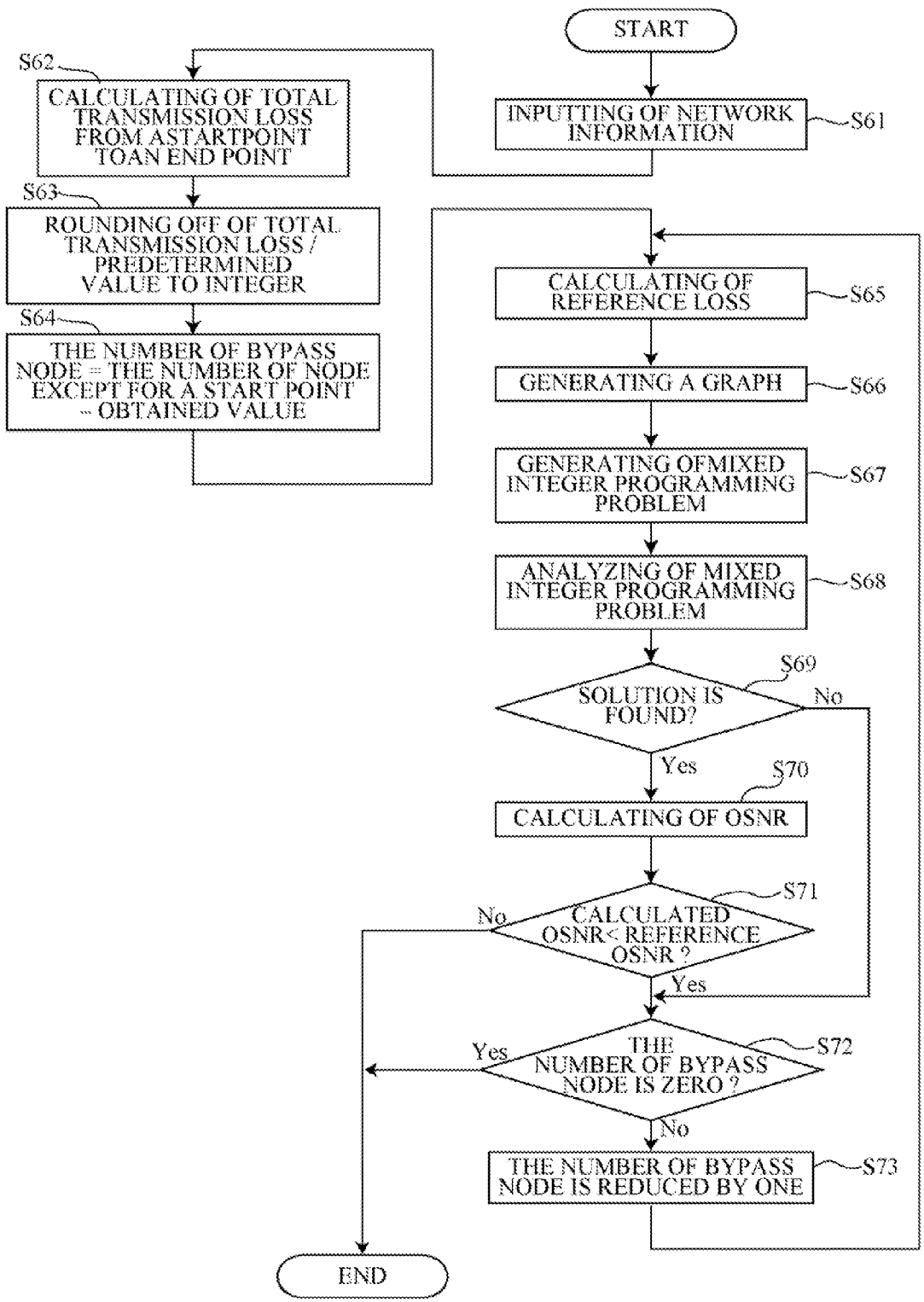
FIG. 14 illustrates a flowchart in accordance with a third modified flowchart.

For example, the network design device 100 may execute a flowchart of FIG. 14 instead of the flowchart of FIG. 6. First, the database 17 stores network information input by a user (Step S61). The network information is input through the inputting device 11. Next, the loss calculating unit 22 calculates the sum of the transmission loss from the start point to the end point (Step S62).

Then, the loss calculating unit 22 rounds a value obtained by dividing the sum of the transmission loss by the upper limit of the transmission loss down to an integer (Step S63). Next, the bypass number setting unit 21 sets the initial value of the number of bypass node to be a value obtained by subtracting the value obtained in Step S63 from the number of nodes except for the start point (Step S64).

Next, the loss calculating unit 22 calculates the reference loss Lav (Step S65). Then, the graph generating unit 23 generates a graph (Step S66). Next, the problem generating unit 24 generates a mixed integer programming problem for searching a path from a start node to an end node on the generated graph (Step S67). Then, the problem analyzing unit 25 analyzes the mixed integer programming problem having the above-mentioned constraint conditions and the objective function (Step S68).

Next, the problem analyzing unit 25 determines whether there is a solution of the mixed integer programming problem (Step S69). If it is determined that a solution is found in Step S69, the comparing unit 26 calculates an OSNR from a start point to an end point with respect to the obtained optical amplifier location (Step S70).

Next, the comparing unit 26 determines whether the calculation OSNR obtained in Step S70 is larger than the reference OSNR (Step S71). If it is determined that the calculation OSNR is larger than the reference OSNR in Step S71, the bypass number setting unit 21 determines whether the number of bypass node is zero (Step S72). If it is not determined that the number of bypass node is zero, the bypass number setting unit 21 reduces the number of bypass node by one (Step S73). After that, the loss calculating unit 22 executes Step S65 again.

If it is not determined that the calculation OSNR is larger than the reference OSNR in Step S71 or it is determined that the number of bypass node is zero in Step S72, the network design device 100 terminates the flowchart.

In the modified embodiment, the initial value of the number of bypass node may be set to be a value closer to the optimized value. It is therefore possible to obtain the location of an optical amplifier earlier with respect to a network in which the number of bypass node finally obtained is large.

Fourth Modified Embodiment

There may be provided a coupling device, a coupling wire or the like coupling a transmission fiber and an optical transmitter or an optical receiver. In this case, it is preferable to consider a loss of the coupling device, the coupling wire or the like in addition to the loss of the transmission fiber. And so, an optical amplifier may be located in view of the loss.

For example, a weight of a link may be calculated with use of a value obtained by adding a loss value given to each node to transmission loss of a span. In concrete, the graph generating unit 23 may obtain a value by adding the loss given to the start node and the end node to the transmission loss of the span and set a square value of a difference between the obtained value and the reference loss to be a variation value in the graph generating of FIG. 7A.

The graph generating unit 23 sets the variation value to be a square value of difference between the reference loss and a value obtained by adding loss values given to a start point node and an end point node to the sum of transmission loss of spans where a bypass link passes, during the generation of the bypass link of FIG. 7B. Further, the graph generating unit 23 may totalize transmission losses given to all nodes, may calculate an average value of the transmission loss by dividing the sum of the transmission losses by the number of node, and may set the twice of the average value to be the reference loss. This means the start point node and the end point node are included. In this case, the reference loss may include the loss given to the nodes.

In the modified embodiment, an optical amplifier may be located in view of loss caused by coupling of a component or the like in addition to the transmission loss of the fiber.

Fifth Modified Embodiment

There is a case where fibers of a transmission path are coupled to each other with a coupler when a node is bypassed. And, there is a case where fibers for transmission path are coupled to each other with fibers for wiring in a station if the fibers for transmission path are away from each other. In this case, it is preferable that a loss caused by the coupling of the fibers is considered in addition to the loss of the fiber for transmission And so, a weight of link may be calculated with use of a value obtained by adding a transmission loss of a span to a loss given to each node, during the generation of the bypass link. In concrete, the graph generating unit 23 may add a loss of a bypassed node to a transmission loss of a span and may set the variation value to be a square of difference between the obtained value and the reference loss, during the generation of the bypass link in FIG. 7B.

The reference loss may be reduced by the loss caused by bypass of a node, because only transmission loss of a span is considered in the calculation of the reference loss. And so, the loss calculating unit 22 totalizes losses caused by bypass of all nodes, calculates an average value by dividing the total value by the number of node, and adds the average multiplied total-bypass-node-number times to the transmission loss from the start point to the end point. The loss calculating unit 22 newly sets a value obtained by dividing the obtained value by (the number of nodes where an optical amplifier is located+1).

In the modified embodiment, an optical amplifier may be located in view of the loss caused by bypass of a node in addition to the transmission loss.

Sixth Modified Embodiment

There is a case where an optical amplifier is located in advance at a node not to be bypassed, in view of a location of OADM (Optical Add Drop Multiplexer) and so on in the future. And so, an optical amplifier may be located on the node not to be bypassed. For example, a bypass link may be defined from a start point, and the definition of the bypass link may be stopped at the node not to be bypassed.

Figure 15:
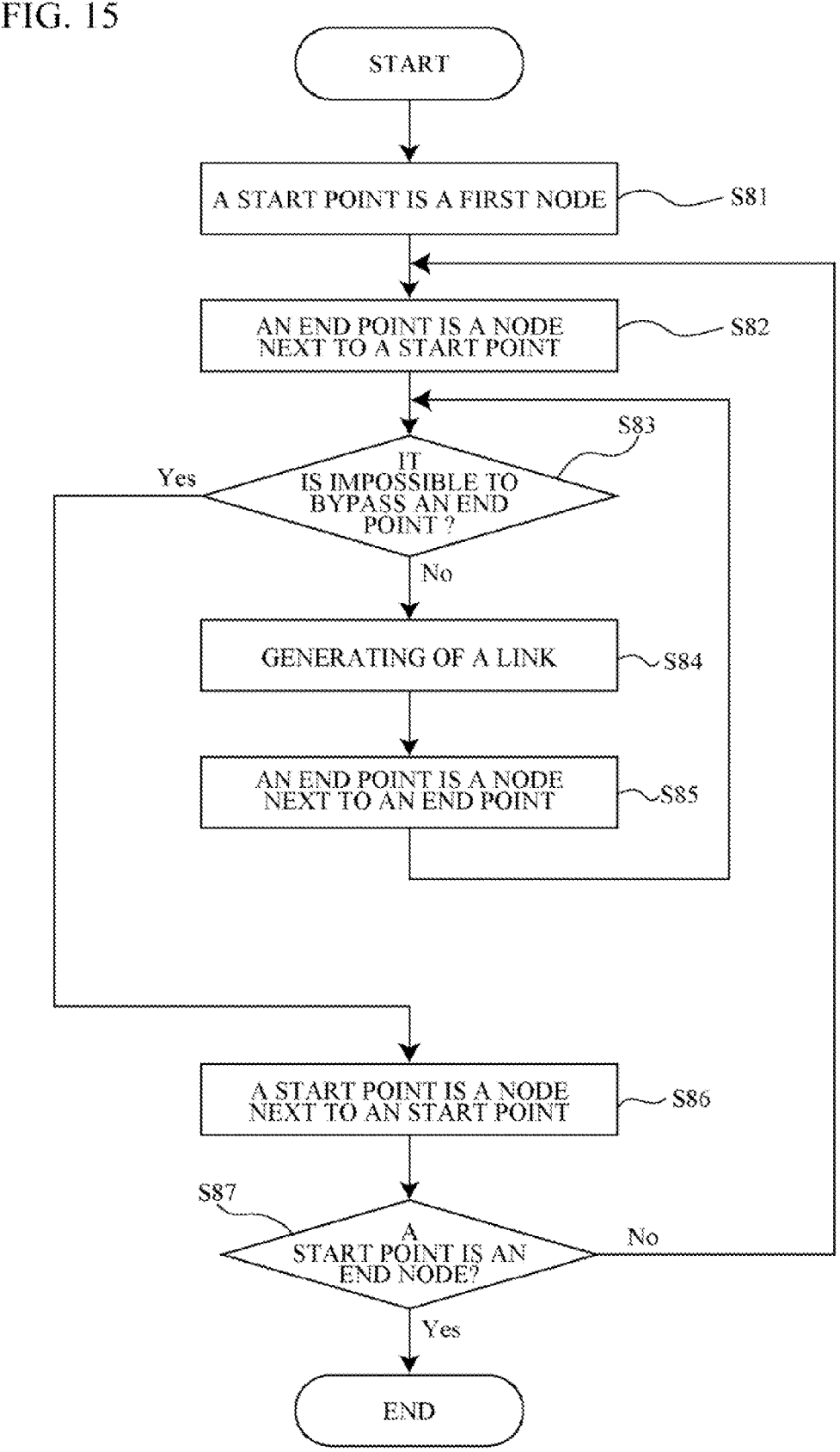
FIG. 15 illustrates a flowchart in accordance with a sixth modified flowchart.

In concrete, the network design device 100 executes a flowchart of FIG. 15 instead of the flowchart of FIG. 8. First, the graph generating unit 23 sets a first node of a network for design to be a start point (Step S81). Next, the graph generating unit 23 sets a node next to the first node to be an end point (Step S82). Then, the graph generating unit 23 determines whether it is not possible to bypass the end point (Step S83). The node not to be bypassed is determined in advance. The end node of the network is set to be a node not to be bypassed, because it is not possible to bypass the end point of the network.

If it is not determined that it is not possible to bypass the end point in Step S83, the graph generating unit 23 defines a link from the start point to the end point with a method illustrated in FIG. 7B (Step S84). Next, the graph generating unit 23 sets the end point to be a node next to the present end point (Step S85). After that, the graph generating unit 23 executes Step S83 again.

If it is determined that it is not possible to bypass the end point in Step S83, the graph generating unit 23 sets the start point to be a node next to the present start end (Step S86). Next, the graph generating unit 23 determines whether the start point set in Step S86 is the end node of the network (Step S87). If it is not determined that the end point is the end node in Step S87, the graph generating unit 23 executes Step S82 again. If it is determined that the start point is the end node in Step S87, the graph generating unit 23 terminates the flowchart.

Figure 16:
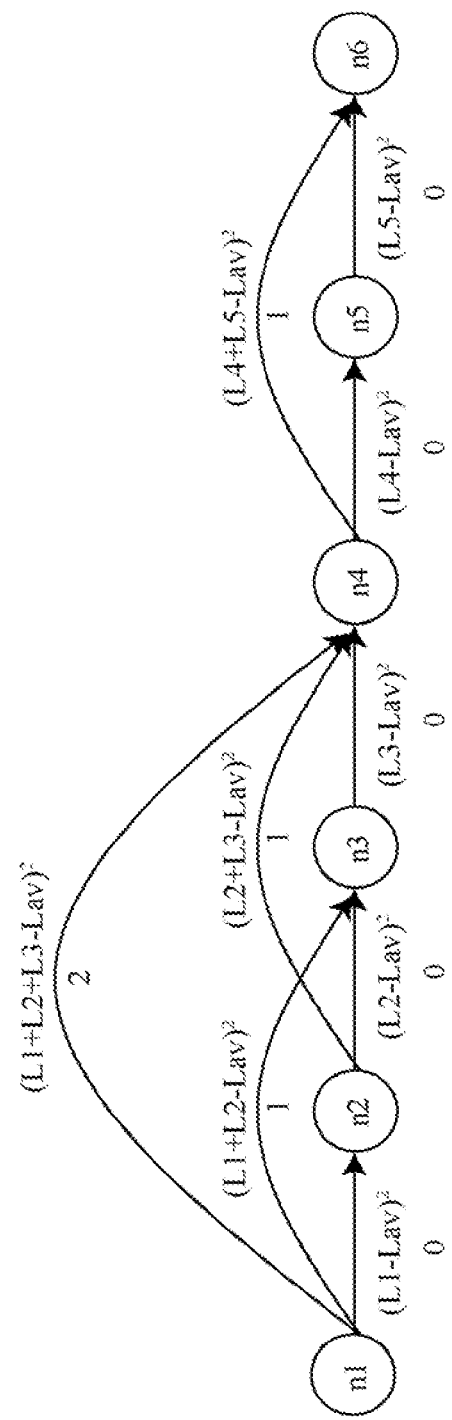
FIG. 16 illustrates an example of a link defined in accordance with the sixth modified embodiment.

FIG. 16 illustrates an example of a link defined in accordance with the modified embodiment. In FIG. 16, the node n4 is not to be bypassed, as an example. With reference to FIG. 16, each path from the node n1 to the node n6 passes through the node n4. Therefore, an optical amplifier is located on the node n4 even if any path of the graph is selected.

In the modified embodiment, an optical amplifier is located so that the node not to be bypassed is not bypassed.

Seventh Modified Embodiment

The number of nodes to be actually bypassed is determined as the number of bypass node, even if the number of node to be bypassed is larger than the number of bypass node. And so, it is allowed to exclude locations in advance, in which the number of bypass node certainly exceeds the set number of bypass node. For example, a bypass link may be defined from a start point in order, the number of bypassed node may be counted, and definition of the bypass link may be stopped when the counted number exceeds the set number of bypass node.

Figure 17:
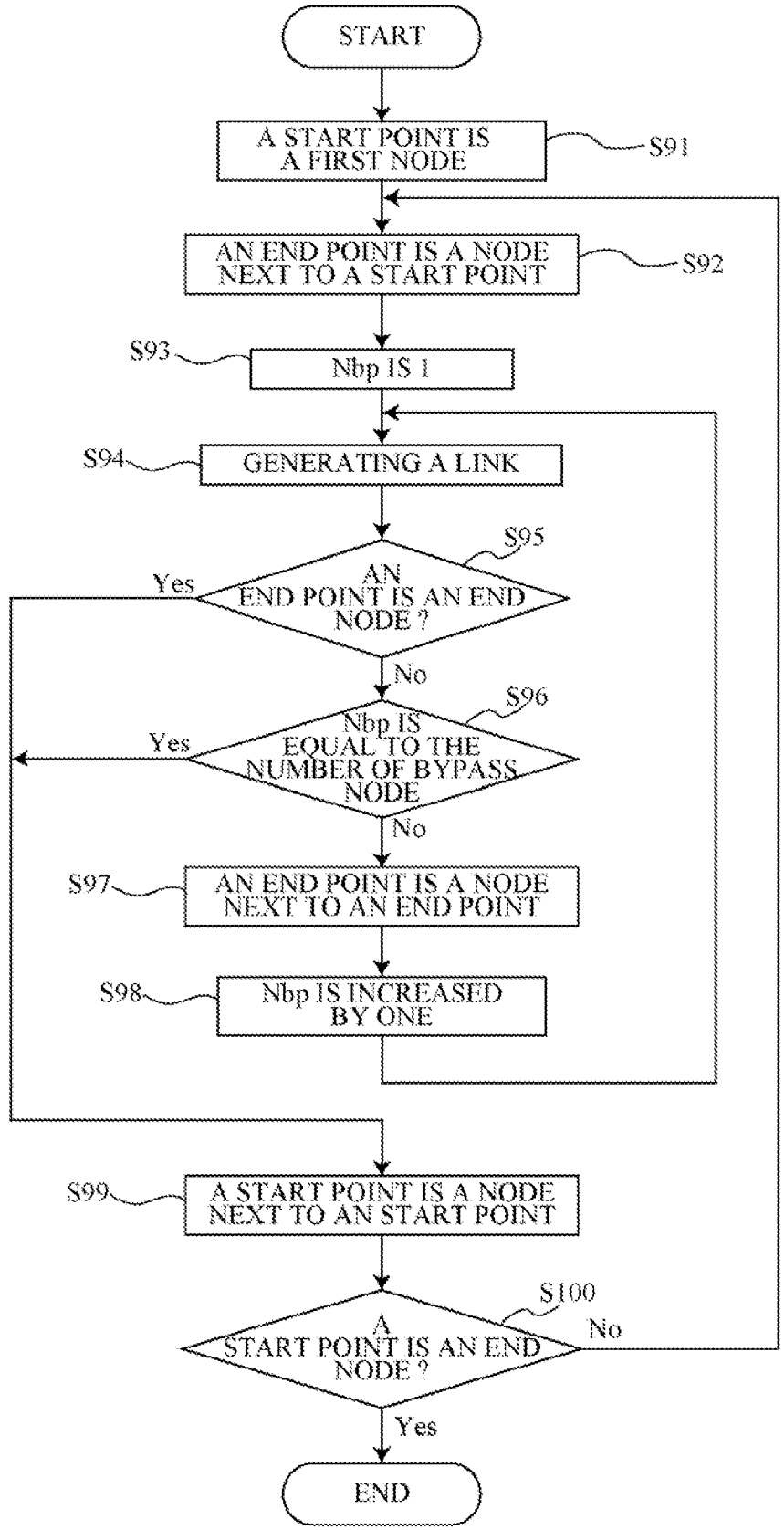
FIG. 17 illustrates a flowchart in accordance with a seventh modified flowchart.

In concrete, the network design device 100 executes a flowchart of FIG. 17 instead of the flowchart of FIG. 8. First, the graph generating unit 23 sets a first node of a network for design to be a start point (Step S91). Next, the graph generating unit 23 sets a node next to the start point to be an end point (Step S92). Then, the graph generating unit 23 sets a counter Nbp to be "1" (Step S93). The counter Nbp is the number of node where a bypass link bypasses.

Next, the graph generating unit 23 defines a link from a start point to an end point with a method as illustrated in FIG. 7B (Step S94). Then, the graph generating unit 23 determines whether the end point set in Step S92 is an end node of the network (Step S95). If it is not determined that the end point is the end node in Step S95, the graph generating unit 23 determines whether the counter Nbp is equal to the number of bypass node set by the bypass number setting unit 21 (Step S96).

If it is not determined the counter Nbp is equal to the set number of bypass node in Step S96, the graph generating unit 23 sets the end point to be a node next to the present end point (Step S97). Next, the graph generating unit 23 adds "1" to the counter Nbp (Step S98). After that, the graph generating unit 23 executes Step S94 again.

If it is determined that the end point is the end node in Step S95 or it is determined that the counter Nbp is equal to the set number of bypass node in Step S96, the graph generating unit 23 sets the start point to be a node next to the present start point (Step S99). Next, the graph generating unit 23 determines whether the start point is the end node of the network (Step S100). If it is not determined that the start point is the end node, the graph generating unit 23 executes Step S92 again. If it is determined that the start point is the end node, the graph generating unit 23 terminates the flowchart.

Figure 18:
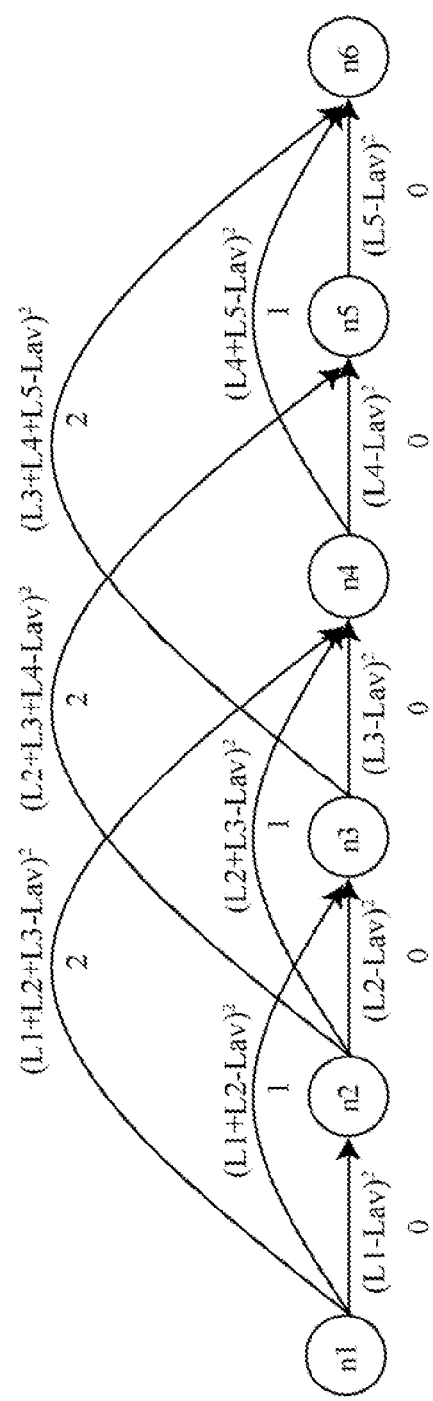
FIG. 18 illustrates an example of a link defined in accordance with the seventh modified embodiment.

FIG. 18 illustrates an example of a link defined in accordance with the modified embodiment. FIG. 18 illustrates a case where the number of bypass node set by the bypass number setting unit 21 is "2". With reference to FIG. 18, a bypass link having three bypassed nodes or more is not defined. In the modified embodiment, a link, in which nodes more than the set number of bypass node are bypassed in series, is not defined. This allows reduction of the number of path combination from a start point to an end point of a generated graph.

Eighth Modified Embodiment

There is no case where an optical amplifier is located so that a node is bypassed in a range larger than the upper limit of transmission loss allowed for an optical amplifier. And so, it is allowed to exclude optical amplifier locations in which a node is bypassed in a range larger than the upper limit of transmission loss allowed for an optical amplifier. For example, a bypass link may be defined from a start point in order, and definition of the bypass link may be stopped when the transmission loss of the bypass link gets larger than the upper limit of the transmission loss given in advance.

Figure 19:
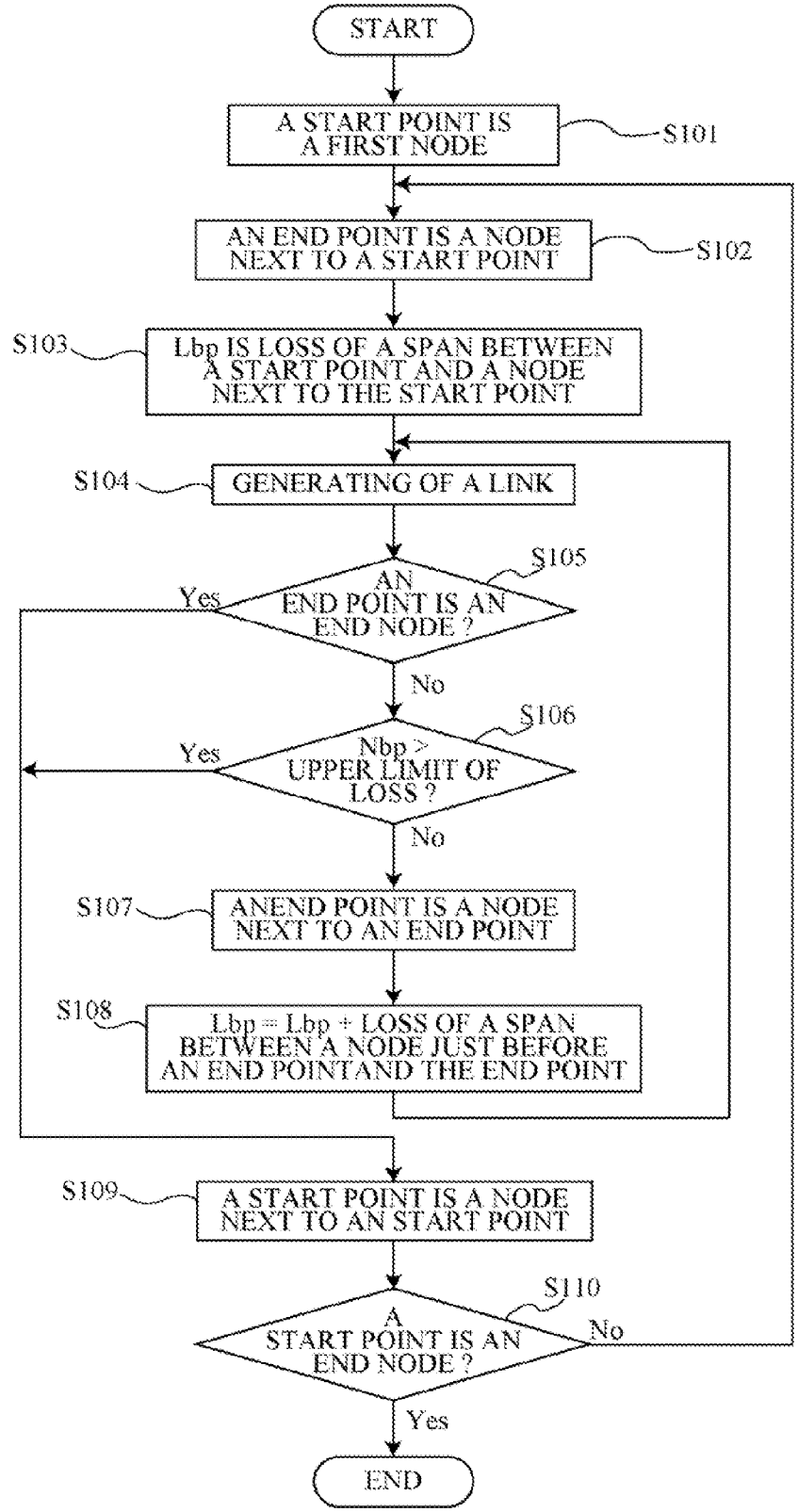
FIG. 19 illustrates a flowchart in accordance with an eighth modified flowchart.

In concrete, the network design device 100 executes a flowchart of FIG. 19 instead of the flowchart of FIG. 8. First, the graph generating unit 23 sets a first node of a network for design to be a start point (Step S101). Next, the graph generating unit 23 sets a node next to the start point to be an end point (Step S102). Then, the graph generating unit 23 sets a transmission loss Lbp to be a loss of a span between the start point and the node next to the start point (Step S103).

Next, the graph generating unit 23 defines a link from the start point to an end point with a method illustrated in FIG. 7B (Step S104). Then, the graph generating unit 23 determines whether the end point set in Step S102 is an end node of the network (Step S105). If it is not determined that the end point is the end node in Step S105, the graph generating unit 23 determines whether the transmission loss Lbp is larger than the upper limit of the transmission loss (Step S106).

If it is not determined that the transmission loss Lbp is larger than the upper limit of the transmission loss in Step S106, the graph generating unit 23 sets the end point to be a node next to the present end point (Step S107). Next, the graph generating unit 23 adds a loss of a span between a node just before the end point and the end point to the transmission loss Lbp (Step S108). After that, the graph generating unit 23 executes Step S104 again.

If it is determined that the end point is the end node in Step S105 or it is determined that the transmission loss Lbp is larger than the upper limit of the transmission loss in Step S106, the graph generating unit 23 sets the start point to be a node next to the present start point (Step S109). Next, the graph generating unit 23 determines whether the start point is the end node of the network (Step S110). If it is not determined that the start point is the end node in Step S110, the graph generating unit 23 executes Step S102 again. If it is determined that the start point is the end node in Step S100, the graph generating unit 23 terminates the flowchart.

Figure 20:
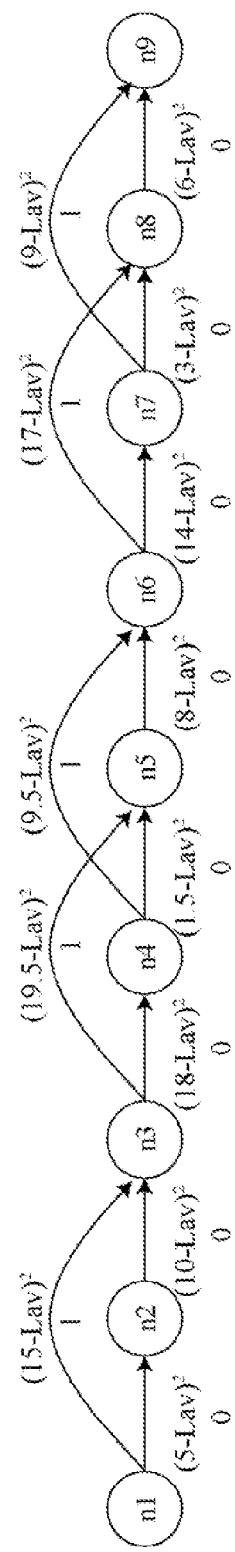
FIG. 20 illustrates an example of a link defined in accordance with the eighth modified embodiment.

FIG. 20 illustrates an example of a link defined in accordance with the modified embodiment. FIG. 20 illustrates a case where the upper limit of the transmission loss is 20 dB. With reference to FIG. 20, a bypass link, in which the transmission loss gets larger than 20 dB when bypassed, is not defined. In the modified embodiment, a bypass link to be bypassed in a range larger than the upper limit of the transmission loss is not defined. It is therefore possible to reduce path combinations from a start point to an end point of a generated graph.

Ninth Modified Embodiment

There is a case where only a path from a start point or an end point to a halfway node or a path from one halfway node to another halfway node are used in an actual transmission. In this case, it is not necessary that an OSNR from the start point to the end point is larger than the reference OSNR. Therefore, a calculation OSNR with respect to an interval used actually has to be larger than the reference OSNR. And so, an optical amplifier may be located so that a calculation OSNR of a designated path is larger than the reference OSNR.

For example, the network information may include a path list for calculating an OSNR. The number of bypass node is increased by one and the analysis of the mixed integer programming problem is continued, when an OSNR of each input path is larger than the reference OSNR.

Figure 21:
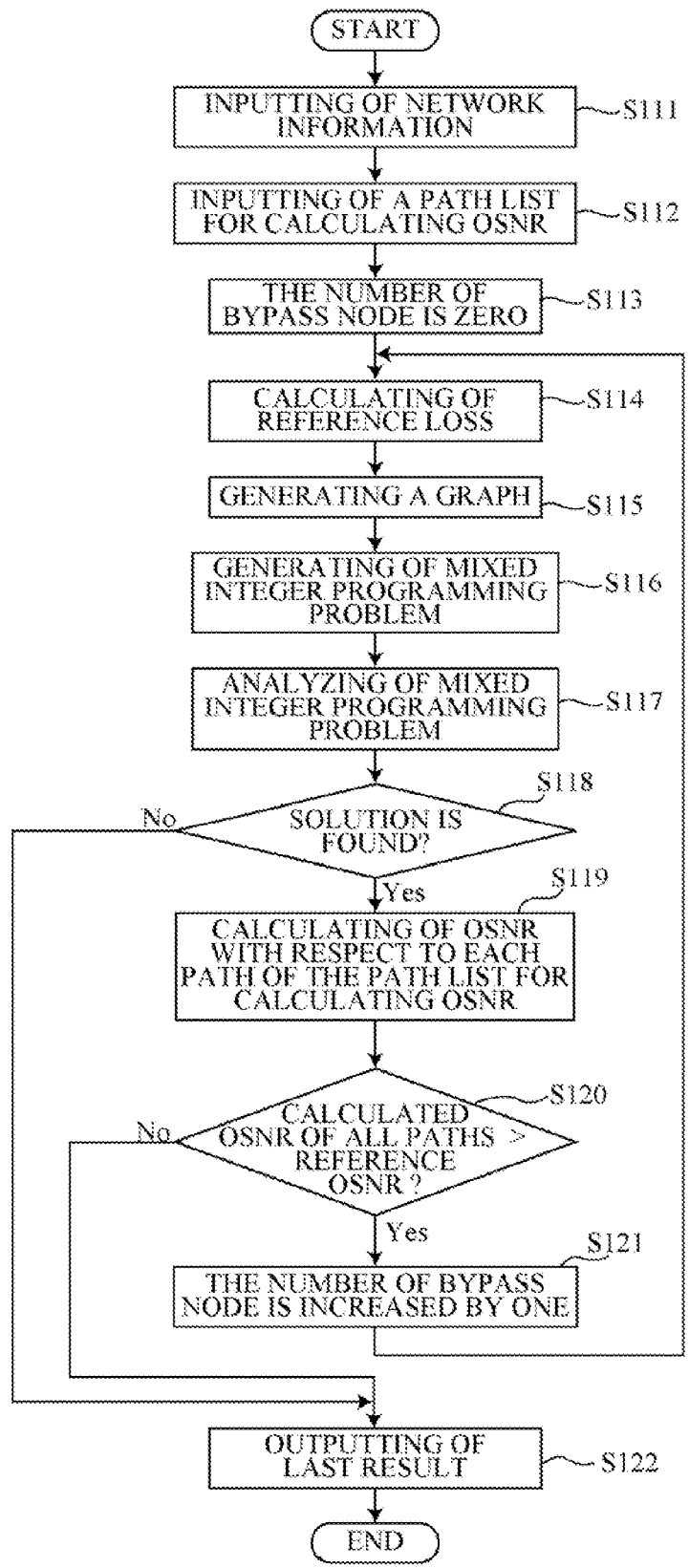
FIG. 21 illustrates a flowchart in accordance with a ninth modified flowchart.

In concrete, the network design device 100 may execute a flowchart of FIG. 21 instead of the flowchart of FIG. 6. First, the database 17 stores network information through the inputting device 11 (Step S111). Next, the database 17 stores a path list for calculating an OSNR through the inputting device 11 (Step S112). The path is input in the form in which nodes to be passed are arrayed from a start point to an end point in order.

Next, the bypass number setting unit 21 initially sets the number of bypass node to be zero (Step S113). Then, the loss calculating unit 22 calculates the reference loss Lav (Step S114). Next, the graph generating unit 23 generates a graph (Step S115). Then, the problem generating unit 24 generates a mixed integer programming problem (Step S116). Next, the problem analyzing unit 25 analyzes the mixed integer programming problem (Step S117).

Next, the problem analyzing unit 25 determines whether a solution of the mixed integer programming problem is found (Step S118). If it is determined that a solution is found in Step S118, the comparing unit 26 calculates the OSNR with respect to each path of the list for calculating the OSNR (Step S119). Next, the comparing unit 26 determines whether all of the calculated OSNR obtained in Step S119 are larger than the reference OSNR (Step S120).

If it is determined that all of the calculated OSNR are larger than the reference OSNR in Step S120, the bypass number setting unit 21 increases the number of bypass node by one (Step S121). After that, the loss calculating unit 22 executes Step S114 again. If it is not determined that a solution is found in Step S118 or it is not determined that all of the OSNR are larger than the reference OSNR, the outputting unit 27 outputs the last result (Step S122). After that, the network design device 100 terminates the flowchart.

In the modified embodiment, an optical amplifier is located so that the OSNR of each designated path is larger than the reference OSNR.

Tenth Modified Embodiment

Figure 22:
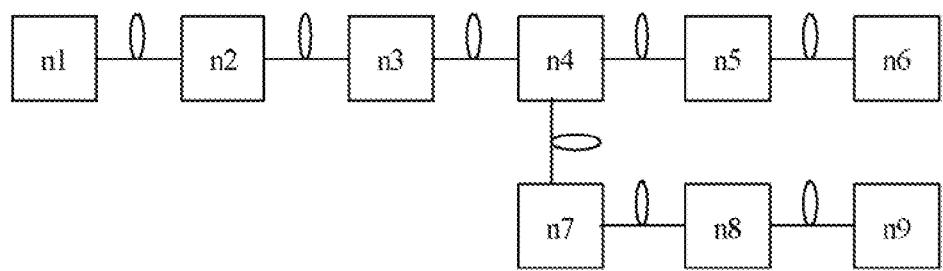
FIG. 22 illustrates an example of a network having a plurality of partial networks.

A network does not always have a structure in which nodes are located in series from a start point to an end point. For example, there is a case where a network is divided into partial networks in which node are simply located in series. FIG. 22 illustrates an example of a network including a plurality of partial networks.

The network of FIG. 22 can be separated into a first partial network including the node n1 to the node n6 and a second partial network including the node n4, and the node n7 to the node n9. A start point is the node n1 and an end point is the node n6, in the first partial network. The first partial network is represented as an order list of the nodes n1, n2, n3, n4, n5, and n6 coupled to each other in order. The order list is used as a path for dividing. Similarly, a start point is the node n4 and an end point is the node n9 in the second partial network. The second partial network is represented as an order list of the nodes n4, n7, n8 and n9 coupled to each other in order.

In a network including a plurality of partial networks, the number of located optical amplifier may be reduced and a whole OSNR of the network may be enlarged. For example, each of the partial networks is used as a path for dividing. And, the path list is stored. Constraint conditions are made with respect to each path. Generated constraint conditions are used as constraints of a single mixed integer programming problem. Sum of an objective function of each path is used as an objective function of a single mixed integer programming problem.

Figure 23:
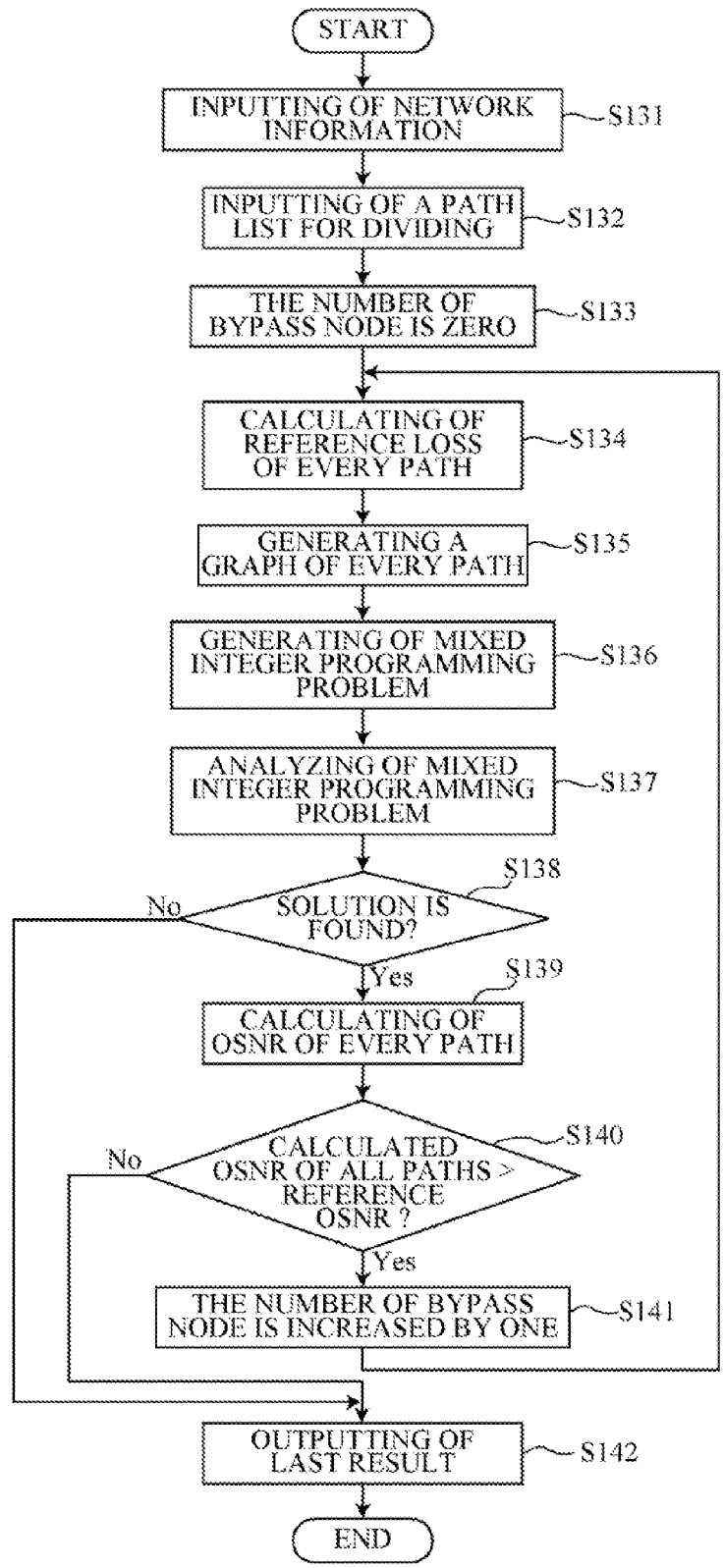
FIG. 23 illustrates a flowchart in accordance with a tenth modified flowchart.

In concrete, the network design device 100 may execute a flowchart of FIG. 23 instead of the flowchart of FIG. 8. First, the database 17 stores network information through the inputting device 11 (Step S131). Next, the database 17 stores a list for dividing through the inputting device 11 (Step S132). The list is input as an order list as illustrated in FIG. 22.

Next, the bypass number setting unit 21 initially sets the number of bypass node to be zero (Step S133). Then, the loss calculating unit 22 calculates the reference loss Lav with respect to each path (Step S134). Next, the graph generating unit 23 generates a graph with respect to each path (Step S135).

Then, the problem generating unit 24 generates a mixed integer programming problem (Step S136). In FIG. 22, the problem generating unit 24 generates mixed integer programming problems of a first partial network and a second partial network, and defines the sum of the objective function of each partial network as a new objective function. And, the problem generating unit 24 defines a constraint condition, in which a constraint condition of the first partial network and a constraint of the second partial network are written, as a new constraint condition. The newly defined constraint condition is the constraint condition of the mixed integer programming problem. Therefore, the amount of the constraint condition is partial-network-number times. Next, the problem analyzing unit 25 analyzes the mixed integer programming problem (Step S137).

Next, the problem analyzing unit 25 determines whether a solution of the mixed integer programming problem is found (Step S138). If it is determined that a solution is found in Step S138, the comparing unit 26 calculates an OSNR of each path with respect to the obtained optical amplifier location (Step S139). In FIG. 22, the comparing unit 26 calculates the OSNR of the node n1 through the node n6 and the OSNR of the node n4, the node n7 through the node n9.

Next, the comparing unit 26 determines whether all of the OSNR calculated in Step S139 are larger than the reference OSNR (Step S140). In FIG. 22, the comparing unit 26 compares the calculation OSNR calculated with respect the first partial network with the reference OSNR of the first partial network, and compares the calculation OSNR calculated with respect to the second partial network with the reference OSNR of the second partial network. The reference OSNR may be common.

If it is determined that all of the OSNR are larger than the reference OSNR, the bypass number setting unit 21 increases the number of bypass node by one (Step S141). After that, the loss calculating unit 22 executes Step S134 again. If it is not determined that a solution is found in Step S138 or it is not determined that all of the OSNR are larger than the reference OSNR in Step S140, the outputting unit 27 outputs the last result (Step S142). After that, the network design device 100 terminates the flowchart.

The branching method after comparing in Step S140 is not limited to the above method. For example, the number of bypass node may not be updated with respect to a partial network having a calculation OSNR less than the reference OSNR, but the number of bypass node may be updated with respect only a partial network having a calculation OSNR being equal to or more than the reference OSNR.

In the modified embodiment, the number of located optical amplifier may be reduced and whole the OSNR may be enlarged with respect to a network having plurality of partial networks.

Eleventh Modified Embodiment

Figure 24:
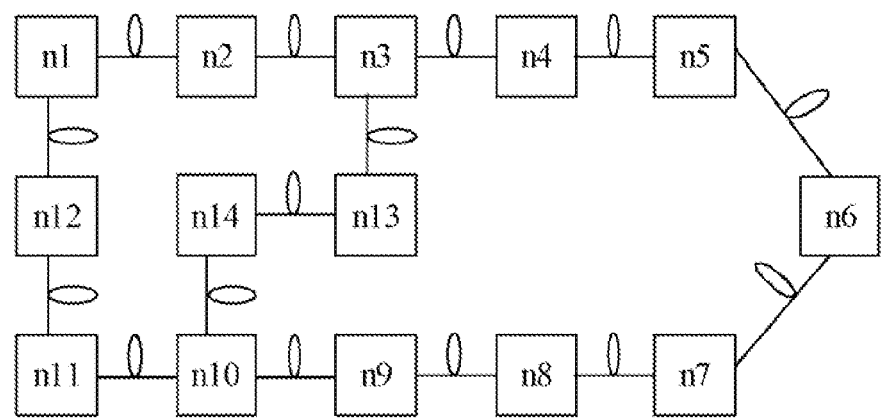
FIG. 24 illustrates an example of a mesh-shaped network having a plurality of partial networks.

A network may be divided into plurality of partial networks when a network of which nodes are coupled to each in the form of mesh is designed in one. FIG. 24 illustrates an example of a mesh-shaped network having a plurality of partial networks. In the network of FIG. 24, the node n3 is coupled to the nodes n2, n4 and n13. The node n10 is coupled to the nodes n11, n14 and n9. Here, a node coupled to three nodes or more is referred to as a hub node.

The number of located optical amplifier may be reduced and whole OSNR of a network may be enlarged with respect to a network having plurality of partial networks. For example, a hub node coupled to three nodes or more may be searched, and a partial network is defined with the hub node and previously designated nodes.

Figure 25:
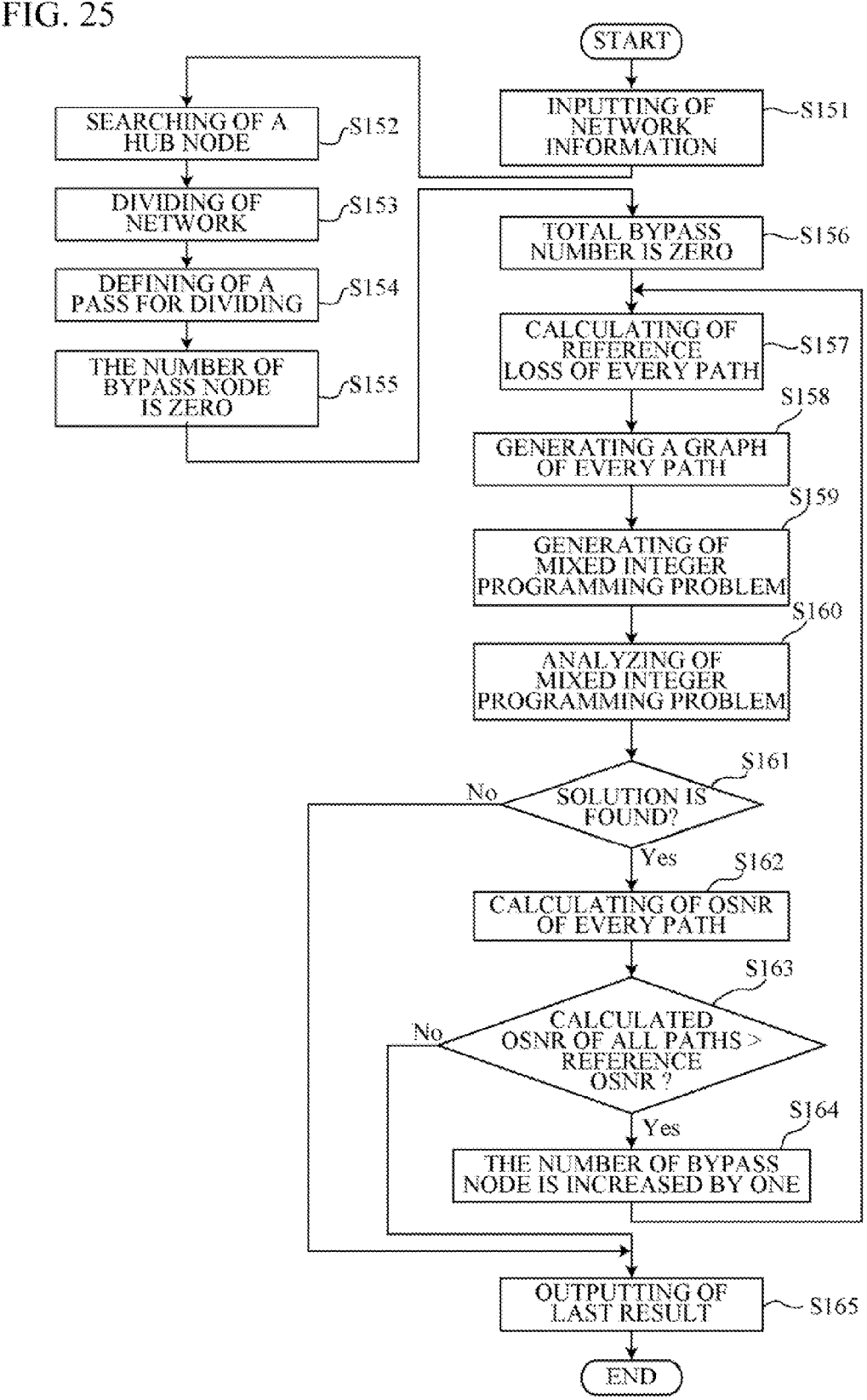
FIG. 25 illustrates a flowchart in accordance with an eleventh modified flowchart.

In concrete, the network design device 100 may execute a flowchart of FIG. 25 instead of the flowchart of FIG. 8. First, the database 17 stores network information through the inputting device 11 (Step S151). Next, the loss calculating unit 22 searches a hub node (Step S152). For example, the loss calculating unit 22 searches the hub node by detecting combinations between nodes with use of the table like FIG. 1B.

FIG. 26 illustrates an example of searching of the hub node. A table of FIG. 26 includes whether each node can be a dividing point during the division of the network. A type of node is written in a second row of the table. "HUB" is written in second row of the node n3 and the node n10. A user may determine a dividing point. As an example, a dividing point determined by the user is written in a second row of the node n6.

Figure 27:
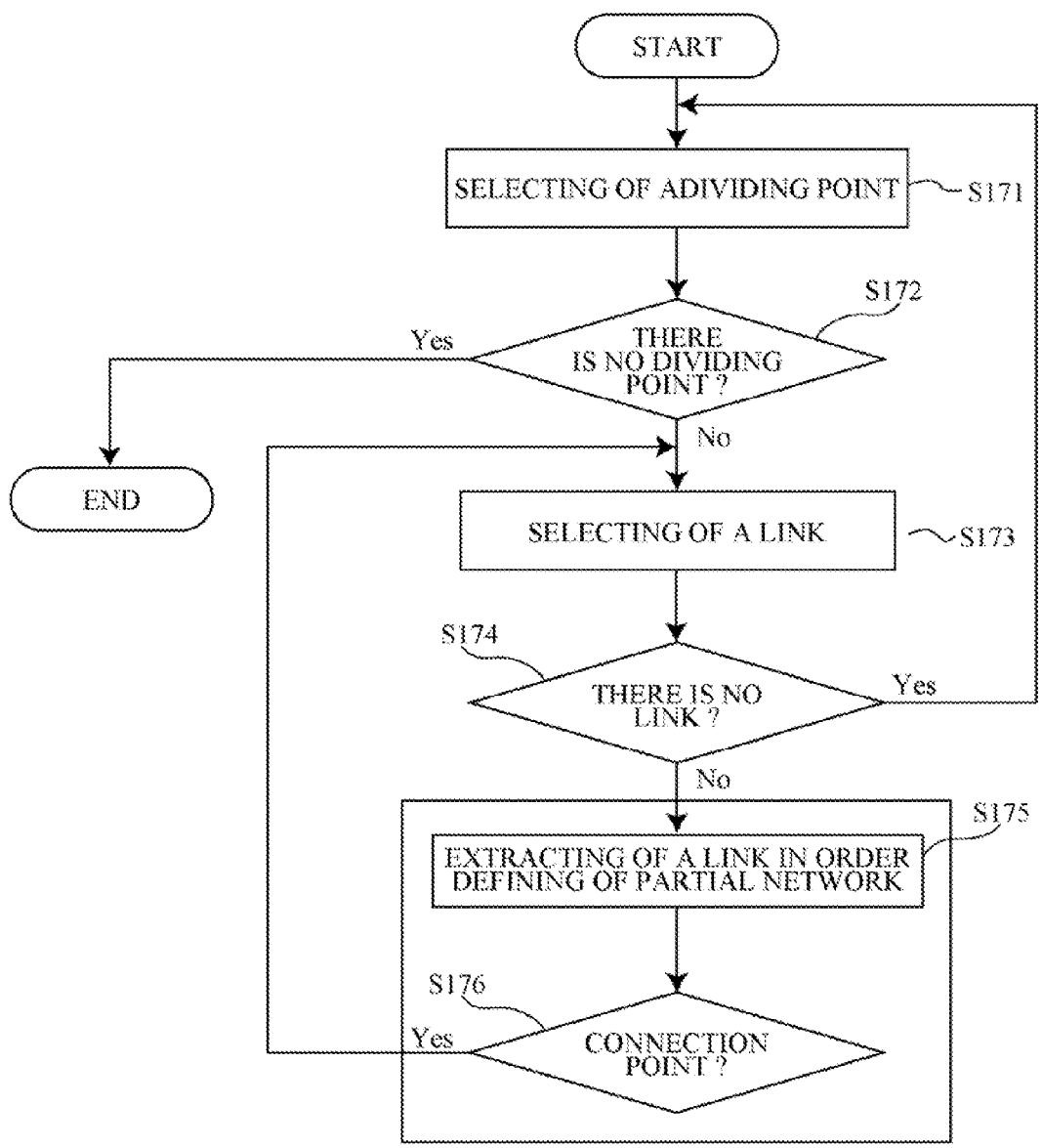
FIG. 27 illustrates an example of a flowchart executes during division of a network.

Next, the loss calculating unit 22 divides the network (Step S153). FIG. 27 illustrates a flowchart for dividing a network. With reference to FIG. 27, the loss calculating unit 22 searches a node acting as a dividing point from a table obtained by hub node searching (Step S171). Next, the loss calculating unit 22 determines whether there is no dividing point (Step S172). If it is determined that there is no dividing point in Step S172, the loss calculating unit 22 terminates the flowchart.

If it is determined that there is a dividing point in Step S172, the loss calculating unit 22 selects a link at the dividing point (Step S173). Next, the loss calculating unit 22 determines whether there is a link (Step S174). If it is determined that there is no link in Step S174, the loss calculating unit 22 executes Step S171 again.

If it is determined that there is a link in Step S174, the loss calculating unit 22 extracts the links in order, and defines partial networks (Step S175). After that, the loss calculating unit 22 determines whether the present point is the coupling point (Step S176). If it is not determined that the present point is the coupling point in Step S176, the loss calculating unit 22 execute Step S175 again. If it is determined that the present point is the coupling point, the loss calculating unit 22 executes Step S173 again.

A description will given of an example to which the flowchart of FIG. 27 is applied. For example, the loss calculating unit 22 selects the node n3 in Step S171. The node n3 has a link directed to the node n2, a link directed to the node n4, and a link directed to the node n13. And so, for example, the loss calculating unit 22 selects a link directed to the node n2 in Step S173. Then, the loss calculating unit 22 detects a structure of a partial network with respect to the nodes n2, n1, n12, and n11 in order.

The detection of a partial network is stopped at the node n10 in Step S176, because the node n10 is a dividing point of the network of FIG. 26. Then, the loss calculating unit 22 again selects a link coupled to the node n3.

There are still remained the link directed to the node n4 and the link directed to the node n13 remains. The loss calculating unit 22 selects, for example, the link directed to the node n4, and detects a partial network with respect to the node n4 and the node n5 in order. Detection of the second partial network is stopped at the node n6, because the node n6 next to the node n5 is the dividing point designated by the user. Further, the loss calculating unit 22 selects the link directed to the node n13 as a link coupled to the node n3, and detects partial networks with respect to the node nodes n3, n13, n14, and n10 in order.

The loss calculating unit 22 selects the next dividing point in Step S171, because the node n3 is not coupled to the other links. For example, the loss calculating unit 22 selects the node n6. The node n6 has a link directed to the node n5 and a link directed to the node n7. The loss calculating unit 22 determines that the link directed to the node n5 is already searched in a case where a network is not designed in a reverse direction independently and selects the link directed to the node n7, because the partial networks of the node n3 to the node n6 are already detected. After that, the loss calculating unit 22 detects partial networks with respect to the nodes n6, n7, n8, n9, and n10 in order.

Next, the loss calculating unit 22 selects the node n10, because there is remained no link coupled to the node n6. The loss calculating unit 22 determined that there is no dividing point, and finishes the dividing of the network, because all partial networks coupled to the node n10 are detected in a case where a network is not designed in a reverse direction independently.

With reference to FIG. 25, the loss calculating unit 22 designates the partial network detected in Step S153 as a designated path (Step S154). Next, the loss calculating unit 22 stores the designated path in the memory 15 (Step S155). After that, the loss calculating unit 22 executes Step S156 to Step S165. Step S156 to Step S165 are the same as Step S133 to Step S142 of FIG. 23.

In the modified embodiment, the number of located optical amplifier may be reduced and whole OSNR may be enlarged, in a network in which nodes are coupled in the form of a mesh. In the modified embodiment, the loss calculating unit 22 acts as a detecting unit for detecting a hub node, and a designating unit for designating a designated path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A network design method executed in a computer comprising:
setting a number of bypass node;
calculating a reference loss based on the number of bypass node;
generating a graph having a variation value obtained based on a difference between a transmission loss of a link coupling nodes to each other and the reference loss;
detecting a minimum-variation-path in which sum of each variation value from a start point to an end point of the graph is minimum;
comparing a calculation OSNR (Optical Signal to Noise Ratio) and a reference OSNR, the calculation OSNR being obtained by a calculation from a start point to an end point assuming that an optical amplifier is located on a node other than a bypass node on the minimum-variation-path; and changing the number of bypass node based on a result of the comparing of the calculation OSNR and the reference OSNR.

2. The network design method as claimed in claim 1, wherein the number of bypass node is increased when the calculation OSNR is equal to or more than the reference OSNR, in the setting of the number of bypass node.

3. The network design method as claimed in claim 1, wherein an initial value of the number of bypass node is obtained based on a value obtained by dividing total transmission loss from a start point to an end point of a network by a given value, in the setting of the number of bypass node.

4. The network design method as claimed in claim 1, wherein an initial value of the number of bypass node is obtained based on a value obtained by dividing a network at a node having total transmission loss of spans therebefore and thereafter that is larger than an allowable loss range of an optical amplifier and dividing total loss from a start point to an end point by a given value with respect to partial networks defined by the division of the network, in the setting of the number of bypass node.

5. The network design method as claimed in claim 1, wherein an initial value of the number of bypass node is obtained based on a value obtained by dividing transmission loss from a start point to an end point of a network by a given upper limit and the number of bypass node is reduced when the calculation OSNR is less than the reference OSNR as a result of the comparing of a calculation OSNR and a reference OSNR, in the setting of the number of bypass node.

6. The network design method as claimed in claim 1, wherein the variation value is obtained with use of a value obtained by adding a loss of a node to a transmission loss of a span, in the generating of a graph.

7. The network design method as claimed in claim 1, wherein the variation value is obtained with use of a value obtained by adding a loss according to a bypass at a bypassed node to a transmission loss of a span when a bypass link bypassing the bypassed node is defined, in the generating of a graph.

8. The network design method as claimed in claim 1, wherein a bypass link is defined from a start point of a link in order when a bypass link bypassing a node is defined, and the defining of the bypass link is stopped at a node not to be bypassed, in the generating of a graph.

9. The network design method as claimed in claim 1, wherein a bypass link is defined from a start point of a link in order when a bypass link bypassing a node is defined, and the defining of the bypass link is stopped when the number of node bypassed by the link exceeds the number of the bypass node set by the setting of the number of bypass node, in the generating of a graph.

10. The network design method as claimed in claim 1, wherein a bypass link is defined from a start point of a link in order when a bypass link bypassing a node is defined, and the defining of the bypass link is stopped when transmission loss of the bypass link exceeds a given upper limit, in the generating of a graph.

11. The network design method as claimed in claim 1, wherein:
a calculation OSNR of a designated path designated in advance is compared with a reference OSNR, in the comparing of a calculation OSNR and a reference OSNR; and the number of bypass node is increased when the calculation OSNR of all of the designated paths is larger than the reference OSNR, in the setting of the number of bypass node.

12. The network design method as claimed in claim 1, wherein:
a reference loss is calculated with respect to each designated path designated in advance, in the calculating of a reference loss;

a graph is generated with respect to each designated path, in the generating of a graph;

a minimum-variation-path is detected on each designated path of the graph, in the detecting of a minimum-variation-path; and a reference OSNR is compared with a calculation OSNR obtained by a calculation from a start point to an end point in a case where an optical amplifier is located on a node other than a bypass on a minimum-variation-path of each designated path, in the comparing of a calculation OSNR and a reference OSNR.

13. The network design method as claimed in claim 12 further comprising:
detecting a hub node coupled to three nodes or more; and designating the designated path with the hub node and a node designated in advance.

14. A network design device comprising:
a bypass number setting unit setting a number of bypass node;

a loss calculating unit calculating a reference loss based on the number of bypass node;

a graph generating unit generating a graph having a variation value obtained based on a difference between a transmission loss of a link coupling nodes to each other and the reference loss;

a path detecting unit detecting a minimum-variation-path in which sum of each variation value from a start point to an end point of the graph is minimum; and a comparing unit comparing a calculation OSNR (Optical Signal to Noise Ratio) and a reference OSNR, the calculation OSNR being obtained by a calculation from a start point to an end point assuming that an optical amplifier is located on a node other than a bypass node on the minimum-variation-path, wherein the bypass number setting unit changes the number of bypass node based on a result of the comparing unit.

* * * * *